United States Patent
Togawa et al.

(10) Patent No.: US 9,505,926 B2
(45) Date of Patent: Nov. 29, 2016

(54) FLAME-RETARDANT THERMOPLASTIC POLYESTER RESIN COMPOSITION AND MOLDED ARTICLE

(71) Applicant: TORAY INDUSTRIES, INC., Tokyo (JP)

(72) Inventors: Kentaro Togawa, Nagoya (JP); Daisuke Sato, Nagoya (JP); Sadanori Kumazawa, Nagoya (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 14/417,906

(22) PCT Filed: Jul. 17, 2013

(86) PCT No.: PCT/JP2013/069361
§ 371 (c)(1),
(2) Date: Jan. 28, 2015

(87) PCT Pub. No.: WO2014/021101
PCT Pub. Date: Feb. 6, 2014

(65) Prior Publication Data
US 2015/0225564 A1    Aug. 13, 2015

(30) Foreign Application Priority Data
Jul. 30, 2012    (JP) ................. 2012-168487

(51) Int. Cl.
*C09J 133/10* (2006.01)
*C08L 67/02* (2006.01)
(52) U.S. Cl.
CPC .............. *C08L 67/02* (2013.01); *C09J 133/10* (2013.01); *C08L 2201/02* (2013.01)
(58) Field of Classification Search
CPC ...................................................... C08L 67/02
USPC ......................................................... 524/127
See application file for complete search history.

(56) References Cited

U.S. PATENT DOCUMENTS

| 4,168,259 A * | 9/1979 | Coleman | C08K 7/14 523/220 |
| 2008/0051495 A1 * | 2/2008 | Murakami | C08K 5/5399 524/100 |
| 2009/0105381 A1 * | 4/2009 | Kuijk | C08K 5/3492 524/127 |
| 2011/0275743 A1 * | 11/2011 | Ishii | C08K 5/0066 524/106 |

FOREIGN PATENT DOCUMENTS

| JP | 06220124 | 8/1994 |
| JP | 06256417 | 9/1994 |
| JP | 959493 | 3/1997 |
| JP | 2001234040 | 8/2001 |
| JP | 2002294051 | 10/2002 |
| JP | 2008169363 | 7/2008 |
| JP | 2009096969 | 5/2009 |
| JP | 2010006965 | 1/2010 |
| JP | 2010077349 | 4/2010 |
| JP | 2010202748 | 9/2010 |
| JP | 2011231150 | 11/2011 |
| WO | 2006090751 | 8/2006 |
| WO | 2011007687 | 1/2011 |
| WO | 2011152371 | 12/2011 |

OTHER PUBLICATIONS

International Search Report for International Application No. PCT/JP2013/069361 mailed Aug. 13, 2013.
Extended European Search Report dated Mar. 1, 2016 for European Application No. 13825485.9.
Chinese Office Action for Chinese Application No. 201380040332.6, dated Aug. 14, 2015, 14 pages.

* cited by examiner

*Primary Examiner* — Doris Lee
(74) *Attorney, Agent, or Firm* — RatnerPrestia

(57) ABSTRACT

The present invention includes a flame-retardant thermoplastic polyester resin composition which provides a molded article having excellent tracking resistance and excellent mechanical characteristics, while maintaining high flame retardancy; and a molded article which is obtained by molding the flame-retardant thermoplastic polyester resin composition. A flame-retardant thermoplastic polyester resin composition of an embodiment of the present invention contains 1-70 parts by weight of two or more (C) phosphorus-containing flame retardants that are selected from the group consisting of (C-1) condensed phosphoric acid esters, (C-2) phosphazene compounds and (C-3) organic metal phosphinates and 1-90 parts by weight of (D) a nitrogen-containing flame retardant per 100 parts by weight of the total of 50-95 parts by weight of (A) a thermoplastic polyester resin and 5-50 parts by weight of (B) a methacrylic resin.

7 Claims, No Drawings

FLAME-RETARDANT THERMOPLASTIC POLYESTER RESIN COMPOSITION AND MOLDED ARTICLE

CROSS REFERENCE TO RELATED APPLICATIONS

This is the U.S. National Phase application of PCT/JP2013/069361, filed Jul. 17, 2013, and claims priority to Japanese Patent Application No. 2012-168487, filed Jul. 30, 2012, the disclosures of each of these applications being incorporated herein by reference in their entireties for all purposes.

FIELD OF THE INVENTION

The present invention relates to a flame-retardant thermoplastic polyester resin composition and a molded article prepared by molding such resin composition. More specifically, the present invention relates to a flame-retardant thermoplastic polyester resin composition having a particular amount of methacrylate resin incorporated therein to thereby improve tracking resistance of the article molded therefrom, and the molded article prepared by molding such resin composition.

BACKGROUND OF THE INVENTION

Thermoplastic polyester resins have been used in a wide variety of fields such as mechanical components of machines, electric and electronic components, and automobile components because of its excellent injection molding adaptability, mechanical properties, and other features.

However, the thermoplastic polyester resins are inflammable by nature, and when the thermoplastic polyester resins are used as an industrial material for machine mechanical components, electric and electronic components, and automobile components, safety to the flame, namely, high flame retardancy as represented by V-0 in the UL-94 standard is required in many cases in addition to the balance between chemical and physical properties generally required in the art. When the thermoplastic polyester resins are used in the environment where electric current is applied, safety to the tracking failure caused by ignition by resin decomposition and carbonization by electric discharge, namely, tracking resistance is required. Accordingly, high tracking resistance as represented by the CTI grade 0 in the IEC 60112 standard is required in many cases, and in particular, higher tracking resistance is demanded due to recent focus of attention on electric vehicle in view of the environmental consciousness.

The method commonly used for providing the thermoplastic polyester resin with tracking resistance include incorporation of an agent for improving the electric properties such as organic phosphinic acid compound or melamine cyanurate.

In addition, a flame retardant resin composition having improved electric properties comprising a polyalkylene terephthalate resin, vinyl resin, or phosphate ester and a salt of a triazine compound and cyanuric acid or isocyanuric acid has been proposed as means for improving the flame retardancy and the electric properties of the thermoplastic polyester resin (see Patent Document 1). However, this proposal had the problem that the flame retardancy and the electric properties were still insufficient.

A flame retardant resin composition having improved electric properties comprising a base resin, a halogen flame retardant, an organic phosphinic acid or its salt, a flame retardant aid, and an aid for improving the electric properties such as melamine cyanurate is also proposed as another means for improving the flame retardancy and the electric properties (see Patent Document 2). This proposal, however, had the problem that the tracking resistance was still insufficient. In addition, the resin composition containing a halogen flame retardant is associated with the risk of the generation of toxic dioxin in its burning, and there is a demand for a flame retardant resin composition containing a non-halogen flame retardant.

The flame retardant resin compositions containing a non-halogen flame retardant that have been proposed include a resin composition prepared by blending a thermoplastic resin such as a polybuthylene terephthalate resin, phosphate ester compound, a thermoplastic resin such as a methacrylate resin (see Patent Document 3); a resin composition containing a polybuthylene terephthalate resin, a thermoplastic resin such as a methacrylate resin, a phosphate ester flame retardant, at least one metal salt selected from alkali metal salt and alkaline earth metal salt, and a salt of a triazine compound and cyanuric or isocyanuric acid (see Patent Document 4); a flame retardant resin composition simultaneously having mechanical properties and flame retardancy prepared by using a non-halogen flame retardant, for example, a resin composition containing a thermoplastic polyester resin, a phosphazene flame retardant, and a phosphate ester flame retardant, and a nitrogen compound such as melamine-cyanuric acid adduct (see Patent Document 5); and a resin composition prepared by blending a phosphor-containing flame-retardant comprising a particular aromatic phosphate ester compound and a phosphate ester compound having a molecular weight of 100 to 500, and a flame-retarding aid such as nitrogen compound based flame retardant to a thermoplastic polyester resin (see Patent Document 6). However, the resin compositions described in the Patent Document 3 and Patent Document 4 had the problem in the insufficient tracking resistance while they were capable of improving the problem of low warpage and the like of the molded articles. In addition, the resin compositions described in the Patent Document 5 and Patent Document 6 also had the problem of insufficient tracking resistance.

PATENT DOCUMENTS

Patent Document 1: Japanese Unexamined Patent Publication (Kokai) No. 2002-294051
Patent Document 2: International Publication WO2006/090751
Patent Document 3: Japanese Unexamined Patent Publication (Kokai) No. 2009-96969
Patent Document 4: Japanese Unexamined Patent Publication (Kokai) No. 2008-169363
Patent Document 5: Japanese Unexamined Patent Publication (Kokai) No. 2011-231150
Patent Document 6: Japanese Unexamined Patent Publication (Kokai) No. 2010-6965

SUMMARY OF THE INVENTION

Thermoplastic polyester resins are decomposed, for example, by electric discharge, and carbide which is the carbonization product remains on the resin surface to become an electroconductive substance that reduces the tracking resistance. One way of improving the tracking resistance of the thermoplastic polyester resin is use of a resin including a minimized amount of structures such as benzene ring requiring high energy for complete combustion which is highly likely to undergo incomplete combustion and leave the carbide on the resin surface due to the incomplete burning. However, the resin free from the structure such as benzene ring is generally inferior in the flame retardancy, and inclusion of such resin is likely to invite poor flame retardancy of the entire resin composition. In the meanwhile, improvement of the flame retardancy by incorporation of a large amount of non-halogen flame retardants has the problem of reduced mechanical properties.

In view of the situation as described above, an object of the present invention is to provide a flame-retardant thermoplastic polyester resin composition which can be molded into an article having excellent tracking resistance and mechanical properties without sacrificing the high flame retardancy. Another object of the present invention is to provide a molded article prepared by molding such resin composition.

In order to solve the problems as described above, the inventors of the present invention conducted an intensive study, and found that the problems as described above can be obviated by incorporating a particular amount of (B) a methacrylate resin in (A) a thermoplastic polyester resin, and further incorporating a particular amount of (C) a phosphor-containing flame retardants which are at least 2 members selected from the group consisting of (C-1) a condensed phosphate ester, (C-2) a phosphazene compound, and (C-3) an organic metal phosphinate salt as well as (D) a nitrogen-containing flame retardant. The present invention has been achieved on the bases of such findings.

The present invention has been completed to obviate the problems as described above, and the present invention provides a flame-retardant thermoplastic polyester resin composition comprising 100 parts by weight in total of 50 to 95 parts by weight of (A) a thermoplastic polyester resin, and 5 to 50 parts by weight of (B) a methacrylate resin; 1 to 70 parts by weight of (C) phosphor-containing flame retardants which are at least 2 members selected from the group consisting of (C-1) a condensed phosphate ester, (C-2) a phosphazene compound, and (C-3) an organic metal phosphinate salt in relation to 100 parts by weight of the total of (A) and (B); and 1 to 90 parts by weight of (D) a nitrogen-containing flame retardant in relation to 100 parts by weight of the total of (A) and (B).

According to the preferable embodiment of the flame-retardant thermoplastic polyester resin composition of the present invention, content of the thermoplastic polyester resin (A) is 70 to 90 parts by weight, and content of the methacrylate resin (B) is 10 to 30 parts by weight.

According to the preferable embodiment of the flame-retardant thermoplastic polyester resin composition of the present invention, the phosphor-containing flame retardant (C) contains the condensed phosphate ester (C-1) and the phosphazene compound (C-2).

According to the preferable embodiment of the flame-retardant thermoplastic polyester resin composition of the present invention, the content ratio of the condensed phosphate ester (C-1) and the phosphazene compound (C-2) is such that the condensed phosphate ester (C-1) is 30 to 70% by weight in relation to 100% by weight of the total of the condensed phosphate ester (C-1) and the phosphazene compound (C-2) and the phosphazene compound (C-2) is 70 to 30% by weight in relation to 100% by weight of the total of the condensed phosphate ester (C-1) and the phosphazene compound (C-2).

According to the preferable embodiment of the flame-retardant thermoplastic polyester resin composition of the present invention, the composition further comprises 1 to 50 parts by weight of (E) an aromatic polycarbonate resin in relation to 100 parts by weight of the total of the thermoplastic polyester resin (A) and the methacrylate resin (B).

According to the preferable embodiment of the flame-retardant thermoplastic polyester resin composition of the present invention, ratio of total content of the condensed phosphate ester (C-1) and the phosphazene compound (C-2) to the total content of the methacrylate resin (B) and the aromatic polycarbonate resin (E) ($\{(C-1)+(C-2)\}/\{(B)+(E)\}$) is 50/50 to 30/70 (weight ratio).

According to the preferable embodiment of the flame-retardant thermoplastic polyester resin composition of the present invention, the composition further comprises 0.01 to 5 parts by weight of (F) an alkaline earth metal salt in relation to 100 parts by weight of the total of the thermoplastic polyester resin (A) and the methacrylate resin (B).

According to the preferable embodiment of the flame-retardant thermoplastic polyester resin composition of the present invention, the alkaline earth metal salt (F) is calcium carbonate.

According to the preferable embodiment of the flame-retardant thermoplastic polyester resin composition of the present invention, the composition further comprises 1 to 150 parts by weight of (G) glass fiber in relation to 100 parts by weight of the total of the thermoplastic polyester resin (A) and the methacrylate resin (B).

The flame-retardant thermoplastic polyester resin composition of the present invention can be produced into a molded article by melt molding.

According to the preferable embodiment of the molded article of the present invention, the molded article has a comparative tracking index based on IEC 60112 of at least 400 V.

According to the preferable embodiment of the molded article of the present invention, a layer formed from the phosphor-containing flame retardant of at least 20 nm is formed on the surface in the burning of the molded article.

The present invention provides a flame-retardant thermoplastic polyester resin composition which has realized a good balance between the tracking resistance and the mechanical properties of the molded article without sacrificing the high flame retardancy. The present invention also enables production of a molded article from such resin composition. The molded article prepared from the flame-retardant thermoplastic polyester resin composition of the present invention is well adapted for use as a molded article such as mechanical components of machines, electric and electronic components, and automobile components.

DETAILED DESCRIPTION OF EMBODIMENTS OF THE INVENTION

Next, the flame-retardant thermoplastic polyester resin composition of the present invention is described in detail.

The flame-retardant thermoplastic polyester resin composition of the present invention preferably comprises 100 parts by weight in total of 50 to 95 parts by weight of (A) a thermoplastic polyester resin, and 5 to 50 parts by weight of (B) a methacrylate resin; 1 to 70 parts by weight of (C) phosphor-containing flame retardants which are at least 2 members selected from the group consisting of (C-1) a condensed phosphate ester, (C-2) a phosphazene compound, and (C-3) an organic metal phosphinate salt in relation to 100 parts by weight of the total of (A) and (B); and 1 to 90 parts by weight of (D) a nitrogen-containing flame retardant in relation to 100 parts by weight of the total of (A) and (B).

The thermoplastic polyester resin (A) used in the present invention is preferably a polymer or a copolymer containing residues of at least one residue selected from (a) a dicarboxylic acid or its ester-forming derivative and a diol or its ester-forming derivative, (b) hydroxy carboxylic acid or its ester-forming derivative, and (c) a lactone as its main structural unit. The expression "containing as its main structural unit" as used herein means that the residues of at least one selected from (a) to (c) constitutes at least 50% by mole, and preferably at least 80% by mole of all structural units.

Examples of the dicarboxylic acid or its ester-forming derivative include aromatic dicarboxylic acids such as terephthalic acid, isophthalic acid, phthalic acid, 2,6-naphthalene dicarboxylic acid, 1,5-naphthalene dicarboxylic acid, bis(p-carboxyphenyl)methane, anthracene dicarboxylic acid, 4,4'-diphenylether dicarboxylic acid, 5-tetrabutylphosphonium isophthalic acid, and 5-sodium sulfoisophthalic acid; aliphatic dicarboxylic acids such as oxalic acid, succinic acid, adipic acid, sebacic acid, azelaic acid, dodecanedioic acid, malonic acid, glutaric acid, and dimer acid; alicyclic dicarboxylic acids such as 1,3-cyclohexanedicarboxylic acid and 1,4-cyclohexanedicarboxylic acid; and ester-forming derivatives thereof.

Examples of the diol or its ester-forming derivative include aliphatic glycols containing 2 to 20 carbon atoms such as ethylene glycol, propylene glycol, 1,4-butanediol, neopentyl glycol, 1,5-pentanediol, 1,6-hexanediol, decamethylene glycol, cyclohexane dimethanol, cyclohexanediol, and dimer diol; long chain glycols having a molecular weight of 200 to 100000 such as polyethylene glycol, poly-1,3-propylene glycol, and polytetramethylene glycol; aromatic dioxy compounds such as 4,4'-dihydroxy biphenyl, hydroquinone, t-butyl hydroquinone, bisphenol A, bisphenol S, and bisphenol F; and ester-forming derivatives thereof.

Examples of polymers or copolymers containing a dicarboxylic acid or its ester-forming derivative and a dial or its ester-forming derivative as its structural unit include aromatic polyester resins such as polyethylene terephthalate, polypropylene terephthalate, polybuthylene terephthalate, polycyclohexane dimethylene terephthalate, polyhexylene terephthalate, polyethylene isophthalate, polypropylene isophthalate, polybutylene isophthalate, polycyclohexane dimethylene isophthalate, polyhexylene isophthalate, polyethylene naphthalate, polypropylene naphthalate, polybutylene naphthalate, polyethylene isophthalate/terephthalate, polypropylene isophthalate/terephthalate, polybutylene isophthalate/terephthalate, polyethylene terephthalate/naphthalate, polypropylene terephthalate/naphthalate, polybuthylene terephthalate/naphthalate, polybuthylene terephthalate/decane dicarboxylate, polyethylene terephthalate/cyclohexane dimethylene terephthalate, polyethylene terephthalate/5-sodium sulfoisophthalate, polypropylene terephthalate/5-sodium sulfoisophthalate, polybuthylene terephthalate/5-sodium sulfoisophthalate, polyethylene terephthalate/polyethylene glycol, polypropylene terephthalate/polyethylene glycol, polybuthylene terephthalate/polyethylene glycol, polyethylene terephthalate/polytetramethylene glycol, polypropylene terephthalate/polytetramethylene glycol, polybuthylene terephthalate/polytetramethylene glycol, polyethylene terephthalate/isophthalate/polytetramethylene glycol, polypropylene terephthalate/isophthalate/polytetramethylene glycol, polybuthylene terephthalate/isophthalate/polytetramethylene glycol, polyethylene terephthalate/succinate, polypropylene terephthalate/succinate, polybuthylene terephthalate/succinate, polyethylene terephthalate/adipate, polypropylene terephthalate/adipate, polybuthylene terephthalate/adipate, polyethylene terephthalate/sebacate, polypropylene terephthalate/sebacate, polybuthylene terephthalate/sebacate, polyethylene terephthalate/isophthalate/adipate, polypropylene terephthalate/isophthalate/adipate, polybuthylene terephthalate/isophthalate/succinate, polybuthylene terephthalate/isophthalate/adipate, and polybuthylene terephthalate/isophthalate/sebacate; and aliphatic polyester resins such as polyethylene oxalate, polypropylene oxalate, polybutylene oxalate, polyethylene succinate, polypropylene succinate, polybutylene succinate, polyethylene adipate, polypropylene adipate, polybutylene adipate, polyneopentyl glycol adipate, polyethylene sebacate, polypropylene sebacate, polybutylene sebacate, polyethylene succinate/adipate, polypropylene succinate/adipate, and polybutylene succinate/adipate. The expression "I" is used to represent a copolymer.

Examples of the hydroxy carboxylic acid or its ester-forming derivative include glycolic acid, lactic acid, hydroxypropionic acid, hydroxybutyric acid, hydroxyvaleric acid, hydroxycaproic acid, hydroxybenzoic acid, p-hydroxybenzoic acid, 6-hydroxy-2-naphthoic acid, and ester-forming derivatives thereof. Examples of polymers or copolymers containing these as its structural unit include aliphatic polyester resins such as polyglycolic acid, polylactic acid, polyglycolic acid/lactic acid, and polyhydroxybutyric acid/β-hydroxybutyric acid/β-hydroxyvaleric acid.

Examples of the lactone include caprolactone, valerolactone, propiolactone, undecalactone, and 1,5-oxepan-2-one. Examples of polymers or copolymers containing these as its structural unit include polycaprolactone, polyvalerolactone, polypropiolactone, and polycaprolactone/valerolactone.

Among these, the thermoplastic polyester resin (A) is preferably polymers or copolymers containing a dicarboxylic acid or its ester-forming derivative and a diol or its ester-forming derivative as its main structural unit, more preferably polymers or copolymers containing an aromatic dicarboxylic acid or its ester-forming derivative and a aliphatic diol or its ester-forming derivative as its main structural unit, and still more preferably polymers or copolymers containing terephthalic acid, naphthalene dicarboxylic acid, or its ester-forming derivative and an aliphatic diol selected from ethylene glycol, propylene glycol, butanediol, and cyclohexane dimethanol or its ester-forming derivative as its main structural unit.

Of these, the more preferred are aromatic polyester resins such as polyethylene terephthalate, polypropylene terephthalate, polybuthylene terephthalate, polycyclohexane dimethylene terephthalate, polyethylene naphthalate, polypropylene naphthalate, polybutylene naphthalate, polyethylene isophthalate/terephthalate, polypropylene isophthalate/terephthalate, polybutylene isophthalate/terephthalate, polyethylene terephthalate/naphthalate, polypropylene terephthalate/naphthalate, and polybuthylene terephthalate/naphthalate; and the most preferred are polybuthylene terephthalate, polyethylene terephthalate, polypropylene terephthalate, polyethylene naphthalate, and polycyclohexane dimethylene terephthalate. These may be used in combination of two or more at any desired contents.

In the present invention, the ratio of the terephthalic acid or its ester-forming derivative in relation to the entire dicarboxylic acid in the polymer or copolymer containing a dicarboxylic acid or its ester-forming derivative and a diol or its ester-forming derivative as its main structural unit is preferably at least 30% by mole and more preferably at least 40% by mole.

In the present invention, the thermoplastic polyester resin (A) used may be a liquid crystal polyester which is capable of providing anisotropy in its molten state. Exemplary structural units of such liquid crystal polyester include aromatic oxycarbonyl unit, aromatic dioxy unit, aromatic and/or aliphatic dicarbonyl unit, alkylene dioxy unit, and aromatic iminoxy unit.

Amount of the carboxyl terminal group in the thermoplastic polyester resin (A) used in the present invention is preferably up to 50 eq/t, more preferably up to 30 eq/t, and still more preferably up to 20 eq/t, and most preferably up to 10 eq/t in view of improving flowability, resistance to hydrolysis, and heat resistance. The lower limit of the amount of the carboxyl terminal group is approximately up to 0 eq/t. The amount of the carboxyl terminal group in the thermoplastic polyester resin (A) is the value measured by dissolving the thermoplastic polyester resin (A) in o-cresol/chloroform solvent, and titrating the solution with ethanolic potassium hydroxide.

Amount of the hydroxy terminal group in the thermoplastic polyester resin (A) used in the present invention is preferably at least 50 eq/t, more preferably at least 80 eq/t, still more preferably at least 100 eq/t, and most preferably at least 120 eq/t in view of improving moldability and flowability. Upper limit in the amount of the hydroxy terminal group is 180 eq/t.

The thermoplastic polyester resin (A) of the present invention may preferably have an intrinsic viscosity as measured by using the solution in o-chlorophenol solution at a temperature of 25° C. in the range of 0.50 to 1.50 dl/g in view of improving the moldability.

The thermoplastic polyester resin (A) of the present invention may preferably have a molecular weight (weight average molecular weight (Mw)) in excess of 8,000 and up to 500,000, more preferably in excess of 8,000 and up to 300,000, and still more preferably in excess of 8,000 and up to 250,000 in view of the heat resistance. In the present invention, the Mw of the thermoplastic polyester resin (A) is the value measured by gel permeation chromatography (GPC) using hexafluoroisopropanol for the solvent and converting the value for polymethyl methacrylate (PMMA).

The thermoplastic polyester resin (A) used in the present invention may be produced by a method known in the art such as polycondensation or ring-opening polymerization. The production may be conducted either by batch polymerization or continuous polymerization, and both ester interexchange reaction and direct polymerization may be employed. However, the preferred is continuous polymerization in view of reducing the amount of the carboxyl terminal group and enhancing the flowability improvement, and the direct polymerization is preferred in view of reducing the cost.

When the thermoplastic polyester resin (A) of the present invention is a polymer or a copolymer produced by condensation of a dicarboxylic acid or its ester-forming derivative and a diol or its ester-forming derivative for the main components, the production may be accomplished by esterification or ester interexchange of the dicarboxylic acid or its ester-forming derivative and the diol or its ester-forming derivative followed by polycondensation.

In order to efficiently promote the esterification, or the ester interexchange and the polycondensation, a polymerization catalyst is preferably added in the reaction. Examples of the polymerization catalyst include organic titanium compounds such as methyl titanate ester, tetra-n-propyl ester, tetra-n-butyl ester, tetraisopropyl ester, tetraisobutyl ester, tetra-tert-butyl ester, cyclohexyl ester, phenyl ester, benzyl ester, and tolyl ester of titanic acid and mixtures thereof; tin compounds such as dibutyltin oxide, methylphenyltin oxide, tetraethyltin, hexaethylditin oxide, cyclohexahexylditin oxide, didodecyltin oxide, triethyltin hydroxide, triphenyltin hydroxide, triisobutyltin acetate, dibutyltindiacetate, diphenyltin dilaurate, monobutyltin trichloride, dibutyltin dichloride, tributyltin chloride, dibutyltin sulfide, butylhydroxytin oxide, and alkyl stannoates such as methyl stannoate, ethyl stannoate, and butyl stannoate; zirconia compounds such as zirconium tetra-n-butoxide, and antimony compounds such as antimony trioxide and antimony acetate.

Of these polymerization catalyst, the preferred are the organic titanium compounds and the tin compound, and the more preferred are tetra-n-propyl ester, tetra-n-butyl ester, and tetraisopropyl ester of titanic acid. The most preferred is tetra-n-butyl ester of titanic acid. In the present invention, two or more such polymerization catalysts may be used in combination. In view of mechanical properties, moldability, and color tone, the polymerization catalyst is added preferably at 0.005 to 0.5 part by weight, and more preferably at 0.01 to 0.2 part by weight in relation to 100 parts by weight of thermoplastic polyester resin.

In the present invention, addition of the methacrylate resin (B) leads to improvement in tracking resistance which is a type of electric properties. The addition of the component (B) also has the effect of suppressing the bleed out of the phosphor-containing flame retardant (C), and such effect of suppressing the bleed out is particularly significant when the component (C) is (C-1) condensed phosphate ester and (C-2) phosphazene compound.

The methacrylate resin (B) used in the present invention is preferably a polymer containing a methacrylate residue as its main structural unit. This polymer may be a homopolymer of a methacrylate such as polymethyl methacrylate or a copolymer of at least 50% by weight of methacrylate and up to 50% by weight of another polymer which is not methacrylate. The expression "containing as its main structural unit" as used herein means that the methacrylate residue constitutes preferably at least 50% by weight, more preferably at least 70% by weight, and still more preferably at least 90% by weight. The composition of the present invention may contain two or more types of methacrylate (B).

The methacrylate used is preferably an alkyl methacrylate, and more preferably, an ester having an alkyl group containing 1 to 4 carbon atoms. Of the esters having an alkyl group containing 1 to 4 carbon atoms, the most preferred is methyl methacrylate. The methacrylate used may be alone or in combination of two or more.

Examples of the monomer other than the methacrylate include acrylates such as methyl acrylate and ethyl acrylate, aromatic alkenyl compounds such as styrene and α-methylstyrene, unsaturated carboxylic acids such as acrylic acid and methacrylic acid, and alkenyl cyanide compounds such as acrylonitrile and methacrylonitrile. Of these, the preferred is the acrylate, and the most preferred is methyl acrylate.

Exemplary polymerization methods used in polymerizing the monomer components as described above include those known in the art such as bulk polymerization, solution polymerization, suspension polymerization, and emulsion polymerization. The polymerization is typically conducted by using a chain transfer agent or a radical polymerization initiator. Preferable exemplary chain transfer agents include mercaptans such as dodecyl mercaptan and octyl mercaptan, and exemplary radical polymerization initiators include organic peroxides and azo compounds.

The methacrylate resin (B) used in the present invention may preferably have a weight average molecular weight (Mw) of at least 50,000, and more preferably at least 80,000 in view of the excellent flame retardancy, mechanical properties, and suppression of the bleed out. The weight average molecular weight (Mw) is preferably up to 300,000, and more preferably up to 200,000 in view of the excellent flowability. In the present invention, the Mw of the methacrylate resin (B) is the value measured by gel permeation chromatography (GPC) using hexafluoroisopropanol for the solvent and converting the value for polymethyl methacrylate (PMMA).

The methacrylate resin (B) used in the present invention may preferably have a melt flow rate (MFR) of at least 0.1 g/10 minutes, more preferably at least 0.5 g/10 minutes, and still more preferably at least one g/10 minutes in view of improving the flowability. At the same time, the melt flow rate (MFR) is preferably up to 40 g/10 minutes, more preferably up to 30 g/10 minutes, and still more preferably up to 20 g/10 minutes in view of the excellent mechanical properties and suppressing the bleed out.

The MFR used herein is the value measured according to the procedure described in ASTM D1238-04, and more specifically, the value measured at a temperature of 230° C. with the load of 37.2 N.

In view of improving the heat resistance, the methacrylate resin (B) used in the present invention may preferably have a glass transition temperature of at least 90° C., more preferably at least 100° C., and still more preferably at least 110° C. Upper limit of the glass transition temperature is preferably up to 150° C. in view of improving the flowability.

The glass transition temperature used herein is the value measured according to the procedure described in JIS K7121:1987, and also, the intermediate point glass transition temperature measured by DSC by elevating the temperature at 20° C./minute.

The methacrylate resin (B) used in the present invention may preferably have a syndiotacticity of at least 40%, and more preferably at least 45% in view of the excellent mechanical properties and suppression of the blood out. In the meanwhile, the syndiotacticity is also preferably up to 90%, and more preferably up to 80% in view of improving the flowability.

In addition, the methacrylate resin (B) may preferably have a heterotacticity of up to 45%, and more preferably up to 40% in view of the excellent tracking resistance, mechanical properties and suppression of the bleed out. The lower limit of the heterotacticity is preferably at least 20%, and more preferably at least 30%.

Furthermore, the methacrylate resin (B) may preferably have an isotacticity of up to 20%, and more preferably up to 15% in view of the excellent mechanical properties and suppression of the bleed out. The lower limit of the hetero tacticity is preferably at least 5%, more preferably at least 8%, and still more preferably at least 10%.

The tacticity such as syndiotacticity, heterotacticity, and isotacticity as used herein may be determined by $^1$H-NMR measurement using deuterated chloroform for the solvent. More specifically, ratio (in percentage) of the integrated intensity of each peak (each of the peaks of the methyl group branching from the straight chain at 0.9 ppm, 1.0 ppm, and 1.2 ppm observed as the syndiotacticity, the heterotacticity, and the isotacticity) in relation to the total (100%) of the integrated intensity peaks is calculated.

In the present invention, content of the thermoplastic polyester resin (A) and the methacrylate resin (B) is preferably such that the content of component (A) is 50 to 95 parts by weight and the content of component (B) is 5 to 50 parts by weight in relation to 100 parts by weight of the total of the component (A) and the component (B) in view of the balance of the flame retardancy, the tracking resistance, and the heat resistance. When the content of component (A) is less than 50 parts by weight and the content of component (B) is in excess of 50 parts by weight, flame retardancy will be poor. The content of component (A) is preferably at least 60 parts by weight, more preferably at least 65 parts by weight, and most preferably at least 70 parts by weight particularly in view of improving the flame retardancy, mechanical properties, flowability, and heat resistance. The content of component (B) is preferably up to 40 parts by weight, more preferably up to 35 parts by weight, and most preferably up to 30 parts by weight in view of the flame retardancy, mechanical properties, flowability, and heat resistance.

In the meanwhile, when the content of the component (A) is in excess of 95 parts by weight and the content of the component (B) is less than 5 parts by weight, the composition will suffer from loss of the tracking resistance and the effect of suppressing the bleed out of the component (C). The content of the component (A) is preferably up to 90 parts by weight in view of the tracking resistance, flowability, heat resistance, and the effect of suppressing the bleed out. The content of the component (B) is preferably at least 10 parts by weight in view of the excellent tracking resistance and the effect of suppressing the bleed out.

The phosphor-containing flame retardants (C) used in the present invention are preferably the phosphor-containing flame retardants (C) comprising at least 2 members selected from the group consisting of (C-1) a condensed phosphate ester, (C-2) a phosphazene compound, and (C-3) organic metal phosphinate salt. Flame retardancy will be improved by the incorporation of the components (C), and the flame retardancy, flowability, and toughness will be further improved by the combined use of at least 2 phosphor-containing flame retardants selected from the group as described above.

With regard to the combination of the components (C), the combination of (C-1) and (C-3) realizes improvement of the flame retardancy while maintaining the mechanical properties at high level. In view of the flame retardancy, mechanical properties, productivity, and cost, the components (C) are preferably a combination selected from (C-1) and (C-1), (C-1) and (C-2), and (C-1) and (C-3), and in view of the balance of electric properties, flame retardancy, and mechanical properties, the more preferred is the combination of (C-1) and (C-2). When the combination of (C-1) and (C-2) is used, the flame retardant layer formed on the surface of the molded article during the burning will be thick, and this leads to significant improvement in the flame retardancy.

Examples of the condensed phosphate ester (C-1) used in the present invention include resorcinol phosphates (resorcinol bis(diphenyl phosphate), resorcinol bis(dicresyl phosphate), resorcinol bis(dixylenyl phosphate), hydroquinone bis(diphenyl phosphate)), hydroquinone phosphates (hydroquinone bis(dicresyl phosphate), hydroquinone bis(dixylenyl phosphate)), biphenol phosphates (biphenol bis(diphenyl phosphate), biphenol bis(dicresyl phosphate), biphenol bis(dixylenyl phosphate)), and bisphenol phosphates (bisphenol-A bis(diphenyl phosphate), bisphenol-A bis(dicresyl phosphate), bisphenol-A bis(dixylenyl phosphate)), which may be used in combination of two or more.

Examples of commercially available condensed phosphate ester (C-1) include PX-202, CR-741, PX-200, PX-201 manufactured by DAIHACHI CHEMICAL INDUSTRY CO., LTD. and FP-500, FP-600, FP-700, FP-800, PFR manufactured by ADEKA.

When the combination of (C-1) and (C-1) is used for the phosphor-containing flame retardants (C), the combination of a resorcinol phosphate and a biphenol phosphate is preferable for the improvement of flame retardancy. Examples of the commercial products of the resorcinol phosphates include PX-200 manufactured by DAIHACHI CHEMICAL INDUSTRY CO., LTD, and the examples of the commercial products of the biphenol phosphates include FP-800 manufactured by ADEKA.

The phosphazene compound (C-2) used in the present invention is not particularly limited as long as it is a compound having —P=N— bond in the molecule, and exemplary such compounds are the chain or cyclic phosphazene compounds having a structure as represented by general formula (1):

[Chemical formula 1]

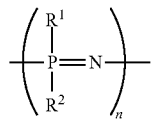

(1)

(In the general formula (1), n represents an integer of 1 to 1000, $R^1$ and $R^2$ independently represent hydrogen atom, a straight chain, branched, or cyclic alkyl group containing at least one and up to 18 carbon atoms, a straight chain, branched, or cyclic alkoxyl group containing at least one and up to 30 carbon atoms, an aryl group containing at least 6 and up to 30 carbon atoms, or an aryloxy group containing at least 6 and up to 30 carbon atoms.)

In the general formula (1), exemplary alkyl groups include methyl group and ethyl group, and exemplary alkoxyl groups include methoxy group and ethoxy group. Exemplary aryl groups include phenyl group, and exemplary aryloxy groups include phenyloxy group. n is preferably 3 to 30, and the preferred is a cyclic phosphazene compound wherein the structures represented by the general formula (1) are bonded in cyclic form.

The phosphazene compound (C-2) may also be a crosslinked phosphazene compound crosslinked by a crosslinking group. Such crosslinked phosphazene compounds may be produced, for example, by crosslinking the chain or cyclic phosphazene compound represented by the general formula (1) with a divalent crosslinking group. Exemplary divalent crosslinking groups include phenylene group (o-phenylene group, m-phenylene group, p-phenylene group), and the bisphenylene group represented by the following general formula (2). The crosslinking group as described above may be used alone or in combination of 2 or more.

[Chemical formula 2]

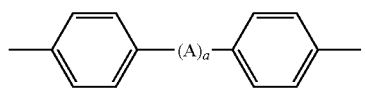

(2)

(In the general formula (2), A represents —C(CH$_3$)$_2$—, —SO$_2$—, —S—, or —O—, and a represents 0 or 1.)

The phosphazene compound (C-2) used may be either the one which has been synthesized or purchased. The synthesis of the phosphazene compound may be conducted by referring to Kajiwara "Synthesis of phosphazene compound and its application (In Japanese)". Exemplary commercially available products include SPS-100, SPB-100, and SPE-100 (crosslinked phosphazene compounds) manufactured by Otsuka Chemical Co., Ltd.

Examples of the organic metal phosphinate salt (C-3) used in the present invention include the metal salt of the phosphine acid represented by the following general formula (3) and the metal salt of the diphosphine acid represented by the following general formula (4).

[Chemical formula 3]

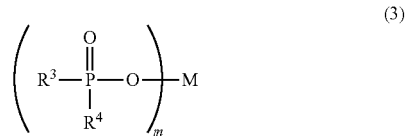

(3)

(In the general formula (3), $R^3$ and $R^4$ are independently, hydrogen atom, a straight chain or branched alkyl group containing 1 to 16 carbon atoms, a cycloalkyl group containing 5 to 8 carbon atoms, or an aryl group containing 6 to 10 carbon atoms. M is calcium, aluminum, or zinc, and m is an integer of 1 to 4)

[Chemical formula 4]

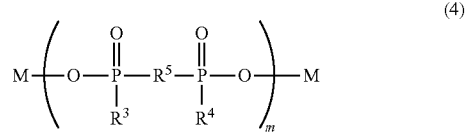

(4)

(In the general formula (4), $R^3$ and $R^4$ are independently, hydrogen atom, a straight chain or branched alkyl group containing 1 to 16 carbon atoms, a cycloalkyl group containing 5 to 8 carbon atoms, or an aryl group containing 6 to 10 carbon atoms. $R^5$ is a straight chain or branched alkylene group containing 1 to 10 carbon atoms, an arylene group containing 6 to 10 carbon atoms, an alkyl arylene group containing 7 to 10 carbon atoms, or an arylalkylene group containing 7 to 10 carbon atoms. M is calcium, aluminum, or zinc, and m is an integer of 1 to 4.)

Examples of the commercially available products of the organic metal phosphinate salt (C-3) include "Exolit" (Registered Trademark) OP1230 and OP1240 manufactured by Clariant (Japan) K.K. A mixture containing the component (C-3) and a nitrogen-containing compound and/or a boron-containing compound is also available from Clariant (Japan) K.K., and exemplary commercially available product is OP1312. Any of these are preferable for use in the present invention.

Content of the components (C) is 1 to 70 parts by weight in relation to 100 parts by weight of the component (A) and the component (B) in view of the balance between the flame retardancy and the toughness. When the content of the components (C) is less than 1 part by weight, flame retardancy will be insufficient, and the content of the components (C) is preferably at least 10 parts by weight, and more preferably at least 20 parts by weight. In the meanwhile, toughness will be poor when the content of the components (C) is in excess of 70 parts by weight, and the content of the components (C) is preferably up to 65 parts by weight, and more preferably up to 60 parts by weight.

In addition, in combining the components (C), the content of each phosphor-containing flame retardant (C) is preferably at least 1% by weight of the total weight of the components (C) which accounts for 100% by weight.

For example, when 2 types of (C-1) are incorporated, the content ratio (weight ratio) of each (C-1) is preferably at least 1% by weight in relation to 100% by weight of the total of the (C-1) and the (C-1). In view of improving the flame retardancy, content of each (C-1) is preferably at least 15% by weight, and more preferably at least 30% by weight. The content ratio (weight ratio) of each (C-1) is preferably up to 99% by weight in relation to 100% by weight of the total of the (C-1) and the (C-1). In view of improving the flame retardancy, content of each (C-1) is preferably up to 85% by weight, and more preferably up to 70% by weight.

When (C-1) and (C-2) are incorporated, the content ratio (weight ratio) of the (C-1) is preferably at least 1% by weight in relation to 100% by weight of the total of the (C-1) and the (C-2). In view of improving the flame retardancy, content of the (C-1) is preferably at least 15% by weight, and more preferably at least 30% by weight. The content ratio (weight ratio) of the (C-1) is preferably up to 99% by weight in relation to 100% by weight of the total of the (C-1) and the (C-2). In view of improving the flame retardancy, content of the (C-1) is preferably up to 85% by weight, and more preferably up to 70% by weight. The content ratio (weight ratio) of the (C-2) when (C-1) and (C-2) are incorporated is preferably at least 1% by weight in relation to 100% by weight of the total of the (C-1) and the (C-2). In view of improving the flame retardancy, content of the (C-2) is preferably at least 15% by weight, and more preferably at least 30% by weight. The content ratio (weight ratio) of the (C-2) is preferably up to 99% by weight in relation to 100% by weight of the total of the (C-1) and the (C-2). In view of improving the flame retardancy, content of the (C-2) is preferably up to 85% by weight, and more preferably up to 70% by weight.

When (C-1) and (C-3) are incorporated, the content ratio (weight ratio) of the (C-1) is preferably at least 1% by weight in relation to 100% by weight of the total of the (C-1) and the (C-3). In view of improving the mechanical properties and flowability, content of the (C-1) is preferably at least 10% by weight, and more preferably at least 20% by weight. The content ratio (weight ratio) of (C-1) is preferably up to 99% by weight in relation to 100% by weight of the total of the (C-1) and the (C-3). In view of improving the flame retardancy, content of the (C-1) is preferably up to 50% by weight, and more preferably up to 40% by weight. The content ratio (weight ratio) of the (C-3) when (C-1) and (C-3) are incorporated is preferably at least 1% by weight in relation to 100% by weight of the total of the (C-1) and the (C-3). In view of improving the flame retardancy, content of the (C-3) is preferably at least 50% by weight, and more preferably at least 60% by weight. The content ratio (weight ratio) of the (C-3) is preferably up to 99% by weight in relation to 100% by weight of the total of the (C-1) and the (C-3). In view of improving the mechanical properties and flowability, content of the (C-3) is preferably up to 90% by weight, and more preferably up to 80% by weight.

In the present invention, flame retardancy will be improved by incorporating the nitrogen-containing flame retardant (D). Examples of the nitrogen-containing flame retardant (D) used in the present invention include aliphatic amine compounds, aromatic amine compounds, nitrogen-containing heterocyclic group compounds, cyanide compounds, aliphatic amide compounds, aromatic amide compounds, and urea and thiourea, which may be used alone or in combination of 2 or more. Of these, the preferred are nitrogen-containing heterocyclic compounds.

Examples of the aliphatic amine compound include ethylamine, butylamine, diethylamine, ethylenediamine, butylene diamine, triethylenetetramine, 1,2-diaminocyclohexane, and 1,2-diaminocyclooctane.

Examples of the aromatic amine compound include aniline and phenylenediamine.

Examples of the nitrogen-containing heterocyclic compound include uric acid, adenine, guanine, 2,6-diaminopurine, 2,4,6-triaminopyridine, and triazine compound.

Examples of the cyanide compound include dicyandiamide.

Examples of the aliphatic amide compound and aromatic amide compound include N,N-dimethyl acetamide and N,N-diphenyl acetamide.

The triazine compound mentioned for the nitrogen-containing heterocyclic compound is a compound having triazine skeleton, and examples include triazine, melamine, benzoguanamine, methylguanamine, cyanuric acid, melamine cyanurate, melamine isocyanurate, trimethyltriazine, triphenyltriazine, ammeline, ammelide thiocyanuric acid, diaminomercaptotriazine, diaminomethyltriazine, diaminophenyltriazine, diaminoisopropoxytriazine, and polyphosphoric acid melamine, and the most preferred are melamine cyanurate, melamine isocyanurate, and polyphosphoric acid melamine.

The melamine cyanurate or the melamine isocyanurate is preferably an addition product of cyanuric acid or isocyanuric acid with a triazine compound, and typical such addition products are those having the compositional ratio of 1:1 (molar ratio), and in some cases, 1:2 (molar ratio). These may be produced by a method known in the art, for example, by mixing the melamine and the cyanuric acid or isocyanuric acid and preparing a water slurry, fully stirring the slurry to form fine particles of the salt between both compounds, and conducting filtration and drying to obtain the powder form product. The salt does not have to be completely pure, and some melamine or some cyanuric acid or isocyanuric acid may remain unreacted. When the dispersion is insufficient, a dispersant such as tris(p-hydroxyethyl) isocyanurate or a known surface treating agent such as polyvinyl alcohol or a metal oxide such as silica may also be used. The melamine cyanurate or the melamine isocyanurate may preferably have an average particle size of 0.1 to 100 μm both before and after its incorporation in the resin in view of the flame retardancy, mechanical strength, and surface properties of the molded article. The average particle size used is the 50% particle diameter in cumulative distribution measured by laser micron sizer method. Examples of the preferable commercial products of melamine cyanurate and melamine isocyanurate include MC-4000, MC-4500, MC-6000, and the like manufactured by Nissan Chemical Industries, Ltd.

Content of the component (D) is 1 to 90 parts by weight in relation to 100 parts by weight of the total of the component (A) and the component (B) in view of the balance between the flame retardancy and the toughness. Content of the component (D) of less than 1 part by weight results in the insufficient flame retardancy, and the content of the component (D) is preferably at least 5 parts by weight, and more preferably at least 10 parts by weight. In the meanwhile, content of the component (D) in excess of 90 parts by weight results in the poor toughness, and the content of the component (D) is preferably up to 85 parts by weight, and more preferably up to 80 parts by weight.

When the flame-retardant thermoplastic polyester resin composition of the present invention contains a condensed phosphate ester (C-1) and a phosphazene compound (C-2) for the phosphor-containing flame retardants (C), addition of an aromatic polycarbonate resin (E) suppresses bleed out, namely, precipitation of the phosphor-containing flame retardant (the component (C-1) or the component (C-2)) on the surface of the molded article. Such addition also results in the reduced shrinkage in the injection molding, and hence, improvement of the dimensional precision.

The aromatic polycarbonate resin (E) used in the present invention may be, for example, an aromatic homo- or co-polycarbonate prepared by reacting an aromatic dihydric phenol compound with phosgene or carbonic acid diester.

Examples of the aromatic dihydric phenol compound include 2,2-bis(4-hydroxyphenyl)propane, 2,2-bis(4-hydroxy-3,5-dimethylphenyl)propane, bis(4-hydroxyphenyl) methane, 1,1-bis(4-hydroxyphenyl)ethane, 2,2-bis(4-hydroxyphenyl)butane, 2,2-bis(4-hydroxy-3,5-diphenyl) butane, 2,2-bis(4-hydroxy-3,5-diethylphenyl)propane, 2,2-bis(4-hydroxy-3,5-diethylphenyl)propane, 1,1-bis(4-hydroxyphenyl)cyclohexane, and 1-phenyl-1,1-bis(4-hydroxyphenyl)ethane, which may be used also in combination of two or more.

The aromatic polycarbonate resin (E) used in the present invention is preferably the one having a weight average molecular weight of 10,000 to 1,100,000. Mechanical properties will be improved when the weight average molecular weight is at least 10,000, and the weight average molecular weight is more preferably at least 60,000. In the meanwhile, flowability in the molding will be improved when the weight average molecular weight is up to 1,100,000. The term "weight average molecular weight" as use herein is the value measured by gel permeation chromatography using tetrahydrofuran for the solvent and converting the value of the polystyrene.

The aromatic polycarbonate resin (E) used in the present invention preferably has a melt flow rate (MFR) as measured at a temperature of 300° C. and under the load of 11.8 N in the range of 1 to 100 g/10 minutes, and more preferably 1 to 50 g/10 minutes in view of improving the mechanical properties.

Content of the component (E) is preferably 1 to 50 parts by weight in relation to 100 parts by weight of the total of the component (A) and the component (B) in view of the balance of the suppression of the bleed out, toughness, flame retardancy, and tracking resistance. The content of the component (E) is preferably at least one part by weight, more preferably at least 2 parts by weight, and still more preferably at least 3 parts by weight particularly in view of improving the flame retardancy, toughness and suppressing of the bleed out. In the meanwhile, the content of the component (E) is preferably up to 50 parts by weight, more preferably up to 45 parts by weight, and still more preferably up to 40 parts by weight in view of the tracking resistance.

In the present invention, ratio of the phosphor-containing flame retardants (C) (total content of the condensed phosphate ester (C-1) and the phosphazene compound (C-2)) to the total content of the methacrylate resin (B) and the aromatic polycarbonate resin (E) ($\{(C-1)+(C-2)\}/\{(B)+(E)\}$) is preferably 50/50 to 30/70 (weight ratio) in view of the particularly good balance of the flame retardancy, mechanical properties, and suppressing of the blood out. When the ratio of the total content of the component (C-1) and the component (C-2)) to the total content of the component (B) and the component (E) is up to 50/50, bleed out of the components (C-1) and (C-2) can be effectively suppressed. In the meanwhile, the flame retardancy can be further improved when the ratio of the total content of the component (C-1) and the component (C-2)) to the total content of the component (B) and the component (E) is at least 30/70.

Further addition of the alkaline earth metal salt (F) in the flame-retardant thermoplastic polyester resin composition of the present invention results in the further improvement of the tracking resistance which is a type of electric properties. The addition of the alkaline earth metal salt (F) also provides significant improvement in the hydrolytic properties and thermolytic properties.

Examples of the salt constituting the alkaline earth metal salt (F) of the present invention include inorganic salts such as carbonate salt, sulphate, and phosphate as well as salts of an organic acid such as acetic acid, lactic acid, oleic acid, palmitic acid, stearic acid, and montanic acid. Examples of the alkaline earth metal salt (F) include magnesium carbonate, calcium carbonate, barium carbonate, magnesium sulfate, calcium sulfate, barium sulfate, magnesium phosphate, calcium phosphate, barium phosphate, magnesium acetate, calcium acetate, barium acetate, magnesium lactate, calcium lactate, barium lactate, and magnesium salt, calcium salt, barium salt, and the like of an organic acid such as oleic acid, palmitic acid, stearic acid, or montanic acid, which may be used alone or in combination of two or more. Of these, the preferred are carbonate of an alkaline earth metal, and the more preferred is calcium carbonate in view of improving the mechanical properties and reducing cost.

Known types of calcium carbonate include colloid calcium carbonate, light calcium carbonate, heavy calcium carbonate, wet ground fine powder heavy calcium carbonate, and wet heavy calcium carbonate (chalk) that have been produced by different methods, and any of these may be used in the present invention.

These alkaline earth metal salt (F) may be also be the one treated with a silane coupling agent or at least one surface treating agent such as organic or inorganic compound. The alkaline earth metal salt (F) is preferably in the form of preferably a powder of up to 10 μm in view of improving dispersibility.

Content of the component (F) is preferably 0.01 to 5 parts by weight in relation to 100 parts by weight of the total of the component (A) and the component (B) in view of the balance between the tracking resistance and the toughness. The tracking resistance will be improved when the content of the component (F) is at least 0.01 part by weight, and the content of the component (F) is more preferably at least 0.1 part by weight, and still more preferably at least 0.5 part by weight. In the meanwhile, toughness will be improved when the content of the component (F) is up to 5 parts by weight, and the content of the component (F) is more preferably up to 4 parts by weight, and still more preferably up to 3 parts by weight.

The flame-retardant thermoplastic polyester resin composition of the present invention may further contain a glass fiber (G), which mainly improves the mechanical strength and the heat resistance.

Examples of the glass fiber (G) used in the present invention include chopped strand-type and robing-type glass fibers. The preferred are glass fiber treated with a silane coupling agent such as aminosilane compound or epoxysilane compound and/or a binder containing urethane, vinyl acetate, or at least one type of epoxy compound such as bisphenol A diglycidyl ether or novolac epoxy compound.

The silane coupling agent and/or the binder may be used by mixing in an emulsion. The glass fiber may preferably have a fiber diameter of 1 to 30 μm, and more preferably 5 to 15 μm.

The glass fiber used may the one having any cross section such as circular glass fiber, oblong glass fiber with any aspect ratio, squashed glass fiber, and dumbbell-shaped glass fiber. Use of the squashed glass fiber and dumbbell-shaped glass fiber results in improved flowability in the injection molding and production of a molded product with reduced warpage.

Content of the component (G) is preferably 1 to 150 parts by weight in relation to 100 parts by weight of the total of the component (A) and the component (B) in view of the balance of mechanical strength, heat resistance, flowability in the injection molding, and durability of the injection molding machine and mold. The mechanical strength and the heat resistance will be further improved when the content of the component (G) is at least 1 part by weight. The content of the component (G) is preferably at least 2 parts by weight, and more preferably at least 3 parts by weight. In the meanwhile, flowability in the injection molding will be improved and abrasion of the molding will then be suppressed when the content is up to 150 parts by weight, and the content of the component (G) is preferably up to 140 parts by weight, and more preferably up to 130 parts by weight.

The flame-retardant thermoplastic polyester resin composition of the present invention may contain at least one of additives known in the art such as an UV absorbent, light stabilizer, plasticizer, and antistatic agent at an amount not adversely affecting the objects of the present invention.

The flame-retardant thermoplastic polyester resin composition of the present invention may also contain an agent for preventing ester interexchange which is added for the purpose of inactivating the esterification catalyst or ester interexchange catalyst. Preferable agents for preventing the ester interexchange are phosphate compounds. The phosphate compound is generic name for the partially esterified compound between an alcohol and phosphoric acid, and those having a low molecular weight are transparent liquid while those having a high molecular weight are white waxy flake solid. Examples include monomethyl acid phosphate, monoethyl acid phosphate, monoisopropyl acid phosphate, monobutyl acid phosphate, monolauryl acid phosphate, monostearyl acid phosphate, monododecyl acid phosphate, monobehenyl acid phosphate, dimethyl acid phosphate, diethyl acid phosphate, diisopropyl acid phosphate, dibutyl acid phosphate, lauryl acid phosphate, distearyl acid phosphate, didodecyl acid phosphate, dibehenyl acid phosphate, trimethyl acid phosphate, and triethyl acid phosphate, which may also be used in combination of two or more.

Preferable phosphate compounds include long chain alkyl acid phosphate compounds such as a mixture of mono- and di-stearyl acid phosphates, an exemplary commercially available product is "ADEKA STAB" (Registered Trademark) AX-71 from ADEKA, which is a flaky solid having a melting point.

The content of the agent for preventing ester interexchange is preferably 0.01 to 5 parts by weight in relation to 100 parts by weight of the total of the component (A) and the component (B) in view of improving the flame retardancy and heat distortion temperature. The heat resistance can be improved when the content of the agent for preventing ester interexchange is at least 0.01 part by weight, and the content of the agent for preventing ester interexchange is more preferably at least 0.02 parts by weight, and still more preferably at least 0.03 parts by weight. In the meanwhile, the flame retardancy can be further improved when the content of the agent for preventing ester interexchange is up to 5 parts by weight, and the content of the agent for preventing ester interexchange is more preferably up to 4 parts by weight, and still more preferably up to 3 parts by weight.

The flame-retardant thermoplastic polyester resin composition of the present invention may also contain a polyfunctional epoxy compound for the purpose of improving hydrolyzability. Polyfunctional epoxy compounds are those containing 2 or more epoxy groups in the molecule, and both liquid and solid ones may be used. Exemplary polyfunctional epoxy compounds include a copolymer of an α-olefin such as ethylene, propylene, or 1-butene and an α,β-unsaturated acid glycidyl ester such as glycidyl acrylate, glycidyl methacrylate, or glycidyl ethacrylate; epoxy group-containing macromolecular compound prepared by epoxizing the double bond portion of a polymer having unsaturated double bond; bisphenol-glycidyl ether epoxy compounds such as bisphenol A, resorcinol, hydroquinone, pyrocatechol, bisphenol F, saligenin, 1,3,5-trihydroxybenzene, bisphenol S, trihydroxy-diphenyldimethylmethane, 4,4'-dihydroxybiphenyl, 1,5-dihydroxynaphthalene, cashew phenol, and 2,2,5,5-tetrakis(4-hydroxyphenyl)hexane; glycidyl ester epoxy compounds such as glycidyl phthalate ester; glycidylamine epoxy compounds such as N-glycidyl aniline; and novolac epoxy resins prepared by reacting novolac phenol resin with epichlorohydrin.

Exemplary preferable polyfunctional epoxy compounds include copolymers of an α-olefin and an α,β-unsaturated carboxylic acid glycidyl ester and novolac epoxy resin prepared by reacting a novolac phenol resin with epichlorohydrin, and the most preferred are novolac epoxy resins prepared by reacting a novolac phenol resin with epichlorohydrin in view of further improving the hydrolyzability and weld properties.

The content of the polyfunctional epoxy compound is preferably 0.01 to 3 parts by weight in relation to 100 parts by weight of the total of the component (A) and the component (B). Heat resistance will be improved when the content of the polyfunctional epoxy compound is at least 0.01 part by weight, and the content of the polyfunctional epoxy compound is preferably at least 0.02 parts by weight, and more preferably at least 0.03 parts by weight. In the meanwhile, flame retardancy can be further improved when the content of the polyfunctional epoxy compound is up to 3 parts by weight, and the content of the polyfunctional epoxy compound is preferably up to 2.5 parts by weight, and more preferably up to 2 parts by weight.

The flame-retardant thermoplastic polyester resin composition of the present invention may also contain a polyhydric alcohol compound containing at least one alkylene oxide unit and 3 or more functional groups for the purpose of improving flowability in the molding such as injection molding. The term "polyhydric alcohol compound" as used herein is a compound having 2 or more hydroxy groups. The polyhydric alcohol compound containing at least one alkylene oxide unit and 3 or more functional groups may be either a low molecular weight compound or a polymer, and any compound is preferable as long as it is a polyhydric alcohol compound containing at least one alkylene oxide unit and 3 or more functional groups such as trifunctional compound, tetrafunctional compound, or pentafunctional compound. The functional group of the "3 or more functional groups" is preferably at least one member selected from hydroxy group, aldehyde group, carboxylic acid group, sulfo group, amino group, glycidyl group, isocyanate group, carbodiimide group, oxazoline group, oxazine group, ester group, amide group, silanol group, and silyl ether group, and the alkylene oxide unit preferably has 3 or more functional groups which are the same or different. More preferably, the 3 or more functional groups are the same type of functional groups particularly in view of flowability, mechanical properties, durability, heat resistance, and productivity.

Preferable examples of the alkylene oxide unit of the polyhydric alcohol compound containing at least one alkylene oxide unit and 3 or more functional groups include aliphatic alkylene oxide units containing 1 to 4 carbon atoms. Examples include methylene oxide unit, ethylene oxide unit, trimethylene oxide unit, propylene oxide unit, tetramethylene oxide unit, 1,2-butylene oxide unit, and 2,3-butylene oxide unit, and isobutylene oxide unit.

In the present invention, preferred is the use of a compound containing ethylene oxide unit or propylene oxide unit as the alkylene oxide unit specifically in view of improving the flowability, recyclability, durability, heat resistance, and mechanical properties. And the most preferred is the embodiment using the compound containing the propylene oxide unit in view of improving the hydrolysis resistance and toughness (tensile elongation at break). With regard to the number of the alkylene oxide units, the number of the alkylene oxide units per functional group is preferably at least 0.1, more preferably 0.5, and still more preferably at least 1 in view of improving the flowability. In the meanwhile, the number of the alkylene oxide units per functional group is preferably up to 20, more preferably up to 10, and still more preferably up to 5 in view of further improving the mechanical properties.

The polyhydric alcohol compound containing at least one alkylene oxide unit and 3 or more functional groups may be the one which has undergone a reaction with the thermoplastic polyester resin (A) to be introduced in the backbone and side chain of the component (A), or the one retaining its structure without undergoing the reaction with the component (A).

In the present invention, the content of the polyhydric alcohol compound containing at least one alkylene oxide unit and 3 or more functional groups is preferably 0.01 to 3 parts by weight in relation to 100 parts by weight of the total of the component (A) and the component (B). The flowability can be improved when the content of the polyhydric alcohol compound is at least 0.01 part by weight, and the content is more preferably at least 0.05 part by weight, and still more preferably at least 0.1 part by weight. In the meanwhile, the mechanical properties can be further improved when the content of the polyhydric alcohol compound is up to 3 parts by weight, and the content is more preferably up to 2.0 parts by weight, and still more preferably up to 1.5 parts by weight.

The flame-retardant thermoplastic polyester resin composition of the present invention may also contain a vinyl resin other than the methacrylate resin (B) for the purpose of improving the toughness such as impact strength. Examples of such vinyl resin include resins prepared by polymerizing at least one monomer selected from the group consisting of aromatic vinyl compounds, vinyl cyanide compounds, alkyl (meth)acrylates, and maleimide monomers; and resins prepared by graft polymerization or copolymerization of a rubber component such as a polybutadiene rubber with such monomer. In the preferable embodiments, total content of the aromatic vinyl compounds, vinyl cyanide compounds, alkyl (meth)acrylates, and maleimide monomers in all monomers is at least 50% by weight.

Exemplary aromatic vinyl compounds include styrene, α-methylstyrene, vinyl toluene, and divinylbenzene, and exemplary phenyl cyanide compounds include acrylonitrile and methacrylonitrile. Exemplary maleimide monomers include maleimide and N-substituted maleimides such as N-methylmaleimide, N-ethylmaleimide, N-phenylmaleimide, N-cyclohexyl maleimide, and derivatives thereof. A vinyl resin prepared by copolymerizing the monomer as described above with a diene compound, dialkyl maleate ester, allyl alkyl ether, unsaturated amino compound, or vinylalkyl ether may also be used in the present invention.

Preferable examples of the vinyl resin include vinyl (co)polymers such as methyl methacrylate/acrylonitrile, polystyrene resin, acrylonitrile/styrene resin (AS resin), styrene/butadiene resin, styrene/N-phenylmaleimide resin, and styrene/acrylonitrile/N-phenylmaleimide resin; styrene resins modified with a rubbery polymer such as acrylonitrile/butadiene/styrene resin (ABS resin), acrylonitrile/butadiene/methyl methacrylate/styrene resin (MARS resin), and high impact-polystyrene resin; and block copolymers such as styrene/butadiene/styrene resin, styrene/isoprene/styrene resin, and styrene/ethylene/butadiene/styrene resin. The preferred are polystyrene resins and acrylonitrile/styrene resins, and the more preferred are acrylonitrile/styrene copolymers which is a copolymer prepared by copolymerizing acrylonitrile and styrene.

The most preferable acrylonitrile/styrene resin is the acrylonitrile/styrene resin containing at least 15% and less than 35% by weight of the acrylonitrile.

The aromatic vinyl compound may also be a vinyl resin prepared by graft polymerization or copolymerization of an unsaturated monocarboxylic acid, an unsaturated dicarboxylic acid, an unsaturated acid anhydride, or an epoxy group-containing vinyl monomer with vinyl resin. Of these, the preferred are vinyl resins prepared by graft polymerization or copolymerization of an unsaturated acid anhydride or an epoxy group-containing vinyl monomer.

The unsaturated acid anhydride is a compound having both the vinyl group and the acid anhydride which can undergo radical polymerization in one molecule. Exemplary preferable unsaturated acid anhydride includes maleic anhydride.

The epoxy group-containing vinyl monomer is a compound having both vinyl group and epoxy group which can undergo radical polymerization in one molecule, and examples include glycidyl esters of an unsaturated organic acid such as glycidyl acrylate, glycidyl methacrylate, and glycidyl ethacrylate, glycidyl itaconate, glycidyl ethers such as allyl glycidyl ether, and derivatives thereof such as 2-methyl glycidyl methacrylate. Of these, the preferred is use of glycidyl acrylate and glycidyl methacrylate. The monomer as described above may be used alone or in combination of two or more.

When the graft polymerization or the copolymerization of an unsaturated monocarboxylic acid, an unsaturated dicarboxylic acid, an unsaturated acid anhydride, or an epoxy group-containing vinyl monomer is conducted, they are preferably used at an amount of at least 0.05% by weight in relation to the vinyl resin. The copolymerization of an excessive amount may result in the flowability loss and gelation, and the amount used is preferably up to 20% by weight, more preferably up to 10% by weight, and still more preferably up to 5% by weight.

The aromatic vinyl compound may also be a vinyl resin which has been epoxy-modified with an epoxidizing agent such as peroxide, performic acid, peracetic acid, or perbenzoic acid. In this case, efficient epoxy modification is accomplished when the vinyl resin has a diene monomer copolymerized therewith by random copolymerization or block copolymerization. Exemplary preferable diene monomers include butadiene and isoprene. Preferable production methods of these epoxy-modified vinyl resins are disclosed, for example, in Japanese Unexamined Patent Publication (Kokai) No. 6-256417 and 6-220124.

Also preferred for use is a vinyl resin constituted from an innermost layer (core layer) having a rubber layer and a vinyl resin covering the innermost layer constituting one of the outer layer (shell layer). Also preferred is a core/shell-type rubber having a so called "core-shell structure".

The rubber layer may be any type of rubber layer as long as it is constituted from a polymer component having a rubber elasticity. Exemplary types of the rubber layer include rubbers comprising a polymerization product of an acryl component, silicone component, styrene component, nitrile component, conjugated diene component, urethane component, ethylene propylene component, or the like. Preferable rubbers include polymerization products of an acryl component such as ethyl acrylate unit or butyl acrylate unit, a silicone component such as dimethylsiloxane unit or phenylmethylsiloxane unit, a styrene component such as styrene unit or α-methylstyrene unit, a nitrile component such as acrylonitrile unit or methacrylonitrile unit, or conjugated diene component such as butadiene unit or isoprene unit. Also included are rubbers comprising a copolymerization product of two or more of such components.

The vinyl resin used for the outer layer (shell layer) may be a vinyl resin prepared by graft polymerization or copolymerization of an unsaturated monocarboxylic acid, an unsaturated dicarboxylic acid, an unsaturated acid anhydride, or an epoxy group-containing vinyl monomer; or a vinyl resin prepared by epoxidizing the vinyl resin with an epoxidizing agent such as a peroxide, performic acid, peracetic acid, or perbenzoic acid.

Preferable examples of the core/shell-type rubber include those wherein the core layer comprises dimethyl siloxane/butyl acrylate polymer and the outermost layer comprises methyl methacrylate polymer or acrylonitrile/styrene copolymer; those wherein the core layer comprises butadiene/styrene polymer and the outermost layer comprises methyl methacrylate polymer or acrylonitrile/styrene copolymer, and those wherein the core layer comprises butyl acrylate polymer and the outermost layer comprises methyl methacrylate polymer or acrylonitrile/styrene copolymer. In the more preferable embodiment, either one or both of the rubber layer and the outermost layer contains glycidyl methacrylate unit.

In the core/shell-type rubber, the weight ratio of the core to the shell is such that the core layer is preferably at least 10% by weight and up to 90% by weight, and more preferably at least 30% by weight and up to 80% by weight in relation to the entire core/shell-type rubber.

The core/shell-type rubber used may be a commercially available product satisfying the condition as described above, or the one prepared by a method known in the art. Examples of the commercially available products include "METABLEN" (Registered Trademark) manufactured by Mitsubishi Rayon Co., Ltd., "Kaneace" (Registered Trademark) manufactured by Kaneka, "PARALOID" (Registered Trademark) manufactured by Dow Chemical Company, and "PARAPET" (Registered Trademark) SA manufactured by Kuraray, which may be used alone or in combination of two or more.

In the present invention, a vinyl resin wherein the vinyl resin is included as a branch of a graft copolymer may also be used, and exemplary resins which can be the backbone in such case include polyolefin resins, acryl resins, and polycarbonate resins. Either one of the branched chain and the backbone may be modified with glycidyl methacrylate or an acid anhydride, and examples include poly(ethylene/glycidyl methacrylate)-g-polymethyl methacrylate (E/GMA-g-PMMA), poly(ethylene/glycidyl methacrylate)-g-polystyrene (E/GMA-g-PS), poly(ethylene/glycidyl methacrylate)-g-acrylonitrile/styrene (E/GMA-g-AS), poly(ethylene-g-acrylonitrile/styrene (E-g-AS), and polycarbonate-g-acrylonitrile/styrene (PC-g-AS), wherein "-g-" represents graft, and "-/-" represents copolymerization.

Examples of the commercially available product include "MODIPER" (Registered Trademark) manufactured by NOF, which may be used alone or in combination with another vinyl resin.

The content of the vinyl resin is preferably 0.1 to 40 parts by weight in relation to 100 parts by weight of the total of the component (A) and the component (B) in view of improving the toughness and mechanical properties. The toughness will be further improved when the content of the vinyl resin is at least 0.1 part by weight, and the content of the vinyl resin is more preferably at least 0.5 part by weight, and still more preferably at least 1 part by weight. In the meanwhile, the mechanical properties will be further improved when the content of the vinyl resin is up to 40 parts by weight, and the content of the vinyl resin is more preferably up to 35 parts by weight, and still more preferably up to 30 parts by weight.

The flame-retardant thermoplastic polyester resin composition of the present invention may also contain a resin which improves impact strength other than the vinyl resin as described above. Examples of the resin improving the impact strength other than the vinyl resin include ethylene-propylene copolymer, ethylene-propylene-non-conjugated diene copolymer, ethylene-butene-1 copolymer, natural rubber, thiokol rubber, polysulfide rubber, polyether rubber, epichlorohydrin rubber, and modified olefin resin prepared by modified ethylene such as an acid anhydride such as maleic anhydride, glycidyl methacrylate, and epoxidizing agent, and those having various degree of crosslinking, various microstructures such as cis- and trans-structures.

Examples of the modified olefin resin prepared by modified ethylene such as an acid anhydride such as maleic anhydride, glycidyl methacrylate, and epoxidizing agent include ethylene/glycidyl methacrylate, ethylene/butene-1/maleic anhydride, ethylene/propylene/maleic anhydride, ethylene/maleic anhydride, and epoxidized olefin resin prepared by epoxidizing ethylene with a peroxide or the like. Examples of the commercially available product include "BONDFAST" (Registered Trademark) E (ethylene/glycidyl methacrylate) manufactured by Sumitomo Chemical Co. Ltd., and "Toughmer" (Registered Trademark) MH-5010 and MH-5020 (ethylene/butene-1/maleic anhydride) manufactured by Mitsui Chemicals, Inc. The most preferred is use of ethylene/butene-1/maleic anhydride in view of highly improving the impact strength.

The content of the resin for improving the impact strength other than the vinyl resin is preferably 0.1 to 10 parts by weight in relation to 100 parts by weight of the total of the component (A) and the component (B). The impact strength will be further improved when the content is at least 0.1 part by weight, and the content is more preferably at least 0.5 part by weight, and still more preferably at least 1 part by weight. In the meanwhile, the mechanical properties will be further improved when the content is up to 10 parts by weight, and the content is more preferably up to 8 parts by weight, and still more preferably up to 6 parts by weight.

In the present invention, a phosphor-containing flame retardant which is known in the art and which is other than the phosphor-containing flame retardant (C) of the present invention may be contained to the extent not adversely affecting the merits of the present invention.

The phosphor-containing flame retardant other than the component (C) is a phosphor-containing flame retardant containing a phosphor component, examples include phosphaphenanthrene compound, ammonium polyphosphate, melamine polyphosphate, and phosphate amide, and red phosphorus, and the preferred is phosphaphenanthrene compound. These flame retardants may be used in combination of two or more.

The phosphaphenanthrene compound is a phosphor-containing flame retardant having at least one phosphaphenanthrene skeleton in the molecule, and exemplary commercially available products include HCA, HCA-HQ, BCA, SANKO-220, and M-Ester produced by SANKO Co. Ltd. Use of these phosphor-containing flame retardants, and in particular, M-Ester is favorable since it is expected to cause a reaction between its terminal hydroxyl group and the terminal of the thermoplastic polyester resin (A) in the melt-kneading, and this reaction is expected to suppresses the bleed out under high temperature high humidity conditions.

The phosphate amide is an aromatic amide flame retardant containing phosphorus atom and nitrogen atom, and it is a substance having a high melting point which is powder at normal temperature. In corporation of this substance results in the production of a flame retardant polyester resin with improved handling convenience and high heat distortion temperature. Examples of commercially available product include SP-703 manufactured by SHIKOKU CHEMICALS CORPORATION.

Examples of the ammonium polyphosphate include ammonium polyphosphate, melamine-modified ammonium polyphosphate, and carbamyl ammonium polyphosphate. The ammonium polyphosphate may be covered with a thermosetting resin such as phenol resin, urethane resin, melamine resin, urea resin, epoxy resin, or urea resin exhibiting thermosetting properties.

Examples of the melamine polyphosphate include melamine phosphate, melamine pyrophosphate, and melamine polyphosphates such as phosphate with the mixture of at least 2 members selected from the group consisting of melamine and melam and melem, and other melamine polyphosphates. Exemplary preferable commercially available products include MPP-A manufactured by Sanwa Chemical Co. Ltd. and PMP-100 and PMP-200 manufactured by Nissan Chemical Industries, Ltd.

The red phosphorus is not limited to the untreated red phosphorus, and also preferred is use of the red phosphorus which has been treated with at least one compound film selected from the group consisting of thermosetting resin film, metal hydroxide film, and metal plated film. Examples of the thermosetting resin used for the thermosetting resin film include phenol-formalin resins, urea-formalin resins, melamine-formalin resins, and alkyd resins. Examples of the metal hydroxide used for the metal hydroxide film include aluminum hydroxide, magnesium hydroxide, zinc hydroxide, and titanium hydroxide. The metal for the metal plating film is not particularly limited as long as it can coat the red phosphorus, and examples include Fe, Ni, Co, Cu, Zn, Mn, Ti, Zr, Al, and alloys thereof. These films may comprise two or more of the materials as mentioned above, and the film may be a laminate of two or more layers.

The content of the phosphor-containing flame retardant other than (C) is preferably 1 to 40 parts by weight in relation to 100 parts by weight of the total of the component (A) and the component (B) in view of improving the flame retardancy and suppressing the bleed out. The flame retardancy will be further improved when the content is at least 1 part by weight, and the content is preferably at least 2 parts by weight, and more preferably at least 3 parts by weight. In the meanwhile, bleed out of the phosphor-containing flame retardant on the surface of the molded article will be more sufficiently suppressed when the content is up to 40 parts by weight, and the content is preferably up to 35 parts by weight, and more preferably up to 30 parts by weight.

In the present invention, a halogen flame retardant such as bromine flame retardant may also be incorporated at a content not adversely affecting the advantageous effect of the present invention.

Examples of the bromine flame retardant include decabromodiphenyl oxide, octabromodiphenyl oxide, tetrabromodiphenyl oxide, tetrabromophthalic anhydride, hexabromocyclododecane, bis(2,4,6-tribromophenoxy)ethane, ethylene bistetrabromophthalimide, hexabromobenzene, 1,1-sulfonyl[3,5-dibromo-4-(2,3-dibromopropoxy)]benzene, polydibromophenylene oxide, tetrabromobisphenol-S, tris(2,3-dibromopropyl-1)isocyanurate, tribromophenol, tribromophenyl allyl ether, tribromoneopentylalcohol, bromated polystyrene, bromated polyethylene, tetrabromobisphenol-A, tetrabromobisphenol-A derivative, tetrabromobisphenol-A-epoxy oligomer or polymer, tetrabromobisphenol-A-carbonate oligomer or polymer, bromated phenol novolac epoxy and other bromated epoxy resins, tetrabromobisphenol-A-bis(2-hydroxydiethyl ether), tetrabromobisphenol-A-bis(2,3-dibromopropyl ether), tetrabromobisphenol-A-bis(allylether), tetrabromocyclooctane, ethylene bispentabromodiphenyl, tris(tribromoneopentyl) phosphate, poly(pentabromobenzyl polyacrylate), octabromotrimethylphenyl indan, dibromoneopentyl glycol, pentabromobenzyl polyacrylate, dibromocresyl glycidyl ether, and N,N'-ethylene-bis-tetrabromophthalimide. Of these, the preferred are tetrabromobisphenol-A-epoxy oligomer, tetrabromobisphenol-A-carbonate oligomer, and bromated epoxy resin.

The content of the halogen flame retardant is preferably 1 to 50 parts by weight, more preferably 2 to 45 parts by weight, and still more preferably 3 to 40 parts by weight in relation to 100 parts by weight of the total of the component (A) and the component (B) in view of further improving the flame retardancy.

The flame-retardant thermoplastic polyester resin composition of the present invention may also contain a flame retardant known in the art such as a silicone flame retardant and an inorganic flame retardant to the extent not adversely affecting the advantageous effect of the present invention.

Examples of the silicone flame retardant include silicone resin and silicone oil. Examples of the silicone resin include resins having a three dimensional network structure prepared by combining structural units such as $SiO_2$, $RSiO_{3/2}$, $R_2SiO$, and $R_3SiO_{1/2}$ wherein R is an alkyl group such as methyl group, ethyl group, or propyl group, an aromatic group such as phenyl group or benzyl group, or any of such group containing vinyl group.

Examples of the silicone oil include polydimethylsiloxane and modified polysiloxanes in the form of polydimethylsiloxane having at least one of the methyl groups on its side chain or terminal modified with at least one group selected from hydrogen atom, alkyl group, cyclohexyl group, phenyl group, benzyl group, amino group, epoxy group, polyether group, carboxyl group, mercapto group, chloroalkyl group, alkyl higher alcohol ester group, alcohol group, aralkyl group, vinyl group, and trifluoromethyl group; and mixtures thereof.

The content of the silicone flame retardant is preferably at least 0.05 part by weight, more preferably at least 0.1 part by weight, and still more preferably at least 0.15 parts by weight in relation to 100 parts by weight of the total of the component (A) and the component (B) so that the silicone flame retardant transfers onto the molded article surface by the heat in the burning to prevent burning of the molded article from its surface. The content of the silicone flame retardant is preferably up to 4 parts by weight, more preferably up to 3 parts by weight, and still more preferably up to 2 parts by weight in view of improving the mechanical properties.

Examples of the inorganic flame retardant include magnesium hydroxide hydrate, aluminum hydroxide hydrate, antimony trioxide, antimony pentaoxide, sodium antimonate, zinc hydroxystannate, zinc stannate, metastannic acid, tin oxide, tin oxide salt, zinc sulfate, zinc oxide, zinc borate, zinc borate hydrate, zinc hydroxide, ferrous oxide, ferric oxide, sulfur sulfide, stannous oxide, stannic oxide, ammonium borate, ammonium octamolybdate, metal tungstate, complex oxide of tungsten and metalloid, ammonium sulfamate, zirconium compound, graphite, and expansive graphite.

The inorganic flame retardant may be optionally surface treated with a fatty acid or a silane coupling agent. Among the inorganic flame retardants, the preferred are zinc borate hydrate and exapansive graphite in view of the flame retardancy. The most preferred are a mixture of magnesium oxide and aluminum oxide, tin stannate, metastannic acid, tin oxide, zinc sulfate, ferric oxide, zinc borate, zinc ferrous oxide, ferric oxide, and sulfur sulfide as the inorganic flame retardant having excellent flame retardancy and residence stability.

The content of the inorganic flame retardant is preferably at least 0.05 part by weight, more preferably at least 0.1 part by weight, and still more preferably at least 0.15 parts by weight in relation to 100 parts by weight of the total of the component (A) and the component (B) in view of realizing endothermic effect in the burning and prevention of burning by expansion. The content of the inorganic flame retardant is preferably up to 4 parts by weight, more preferably up to 3 parts by weight, and still more preferably up to 2 parts by weight in view of improving the mechanical properties.

The flame-retardant thermoplastic polyester resin composition of the present invention may also contain a component which is preferably a fluororesin for the purpose of suppressing melt dripping in the burning and further improving the flame retardancy.

The fluororesin is a resin containing fluorine in the substance molecule, and examples include polytetrafluoroethylene, polyhexafluoropropylene, (tetrafluoroethylene/hexafluoro propylene) copolymer, (tetrafluoroethylene/perfluoroalkylvinyl ether) copolymer, (tetrafluoroethylene/ethylene) copolymer, (hexafluoropropylene/propyrene) copolymer, polyvinylidene fluoride, and (vinylidene fluoride/ethylene) copolymer.

Of these, the preferred are polytetrafluoroethylene, (tetrafluoroethylene/perfluoroalkylvinyl ether) copolymer, (tetrafluoroethylene/hexafluoropropylene) copolymer, (tetrafluoroethylene/ethylene) copolymer, and polyvinylidene fluoride, and the most preferred are polytetrafluoroethylene and (tetrafluoroethylene/ethylene) copolymer.

Content of the fluororesin is preferably 0.05 to 3 parts by weight in relation to 100 parts by weight of the total of the component (A) and the component (B). When the content is at least 0.05 part by weight, the effect of preventing melt dripping during the burning will be improved, and the content is more preferably at least 0.1 part by weight, and still more preferably at least 0.15 parts by weight. In the meanwhile, mechanical properties will be further improved when the content is up to 2 parts by weight, and the content is preferably up to 1.5 parts by weight.

The flame-retardant thermoplastic polyester resin composition of the present invention may also contain a mold release agent for the purpose of improving the releasability in the injection molding. Exemplary mold release agents include mold release agents for plastic material known in the art such as a fatty acid amide such as ethylene bisstearylamide, a fatty acid amide comprising a polycondensate of ethylenediamine with stearic acid and sebacic acid or a polycondensate of phenylenediamine with stearic acid and sebacic acid, polyalkylene waxes, acid anhydride-modified polyalkylene waxes, and a mixture of such lubricant with a fluororesin or fluorine compound.

The content of the mold release agent is preferably 0.01 to 1 part by weight in relation to 100 parts by weight of the total of the component (A) and the component (B). Sufficient releasability effects are realized when the content is at least 0.01 part by weight, and the content is preferably at least 0.02 parts by weight, and more preferably at least 0.03 parts by weight. In the meanwhile, mechanical properties is further improved when the content is up to 1 part by weight, and the content is preferably up to 0.8 part by weight, and more preferably up to 0.6 part by weight.

The flame-retardant thermoplastic polyester resin composition of the present invention may also contain a filler other than the glass fiber (G) for the purpose of increasing the mechanical strength and thermal distortion temperature.

Such filler may be any of needle, particular, and powder fillers, and examples include aramid fiber, carbon fiber, various organic fibers, glass beads, glass flakes, potassium titanate whiskers, wollastonite, silica, kaolin, talc, zinc oxide, magnesium oxide, aluminum oxide, a mixture of magnesium oxide and aluminum oxide, fine powder silicic acid, aluminum silicate, silicon oxide, smectite clay minerals (montmorillonite, hectorite, etc.), vermiculite, mica, fluorine taeniolite, zirconium phosphate, titanium phosphate, and dolomite.

The content of the filler is preferably 1 to 100 parts by weight, more preferably 2 to 95 parts by weight, and still more preferably 3 to 90 parts by weight in relation to 100 parts by weight of the total of the component (A) and the component (B) in view of improving flowability in the injection molding as well as durability of the injection molding machine and the mold.

The filler as described above may also be the one which has been surface treated, for example, by coupling agent, epoxy compound, or ionization.

The flame-retardant thermoplastic polyester resin composition of the present invention may contain one or more types of end capping agent such as epoxy compound, oxazoline compound, carbodiimide-modified isocyanate compound, or carbodiimide compound for the purpose of improving hydrolyzability.

The content of the end capping agent is preferably 0.01 to 3 parts by weight in relation to 100 parts by weight of the total of the component (A) and the component (B). Sufficient improvement in the hydrolyzability will be realized when the content is at least 0.01 part by weight. In the meanwhile, mechanical strength will be further improved when the content is up to 3 parts by weight, and the content is more preferably up to 2.5 parts by weight, and still more preferably up to 2 parts by weight.

The flame-retardant thermoplastic polyester resin composition of the present invention may also contain a stabilizer in view of providing excellent heat resistant aging properties so that the composition of the present invention can endure exposure to high temperature for a prolonged period. Exemplary stabilizers include hindered phenol antioxidants, phosphite antioxidants, and thioether antioxidants, which may be used in combination of two or more.

The content of the stabilizer is preferably at least 0.01 part by weight, more preferably at least 0.02 parts by weight, and still more preferably at least 0.03 parts by weight in relation to 100 parts by weight of the total of the component (A) and the component (B) in view of improving the heat resistant aging properties. In view of further improving the mechanical properties, the content of the stabilizer is preferably up to 2 parts by weight, more preferably up to 1.5 parts by weight, and still more preferably up to 1 part by weight.

The flame-retardant thermoplastic polyester resin composition of the present invention may also contain one or more of carbon black, titanium oxide, and other pigments and dyes of various colors to thereby adjust the color and simultaneously improve weatherability (light resistance) and electroconductivity.

The content of the pigment or the dye is preferably 0.01 to 3 parts by weight in relation to 100 parts by weight of the total of the component (A) and the component (B). Color adjustment, weatherability (light resistance), and electroconductivity effects will be further improved when the content is 0.01 part by weight, and the content is preferably at least 0.02 parts by weight, and more preferably at least 0.03 parts by weight. In the meanwhile, the mechanical properties will be further improved when the content is up to 3 parts by weight, and the content is preferably up to 2 parts by weight, and more preferably up to 1 part by weight.

Examples of the carbon black as mentioned above include channel black, furnace black, acetylene black, anthracene black, lamp black, soot of burnt pine, and graphite. The carbon black used is preferably the one having an average particle size of up to 500 nm, and a dibutyl phthalate absorption of 50 to 400 $cm^3/100$ g. The carbon black may be the one treated with aluminum oxide, silicon oxide, zinc oxide, zirconium oxide, polyol, or a silane coupling agent.

The titanium oxide is preferably the one having a rutile or anatase crystalline structure, and an average particle size of up to 5 μm, and the titanium oxide may be the one treated with aluminum oxide, silicon oxide, zinc oxide, zirconium oxide, polyol, or silane coupling agent.

The carbon black, titanium oxide, and the pigment and dye of various colors may be used as a mixed material after melt blending or by simply blending with various thermoplastic resins for the purpose of improving dispersion properties with the flame-retardant thermoplastic polyester resin composition of the present invention as well as handling convenience in the production.

The flame-retardant thermoplastic polyester resin composition of the present invention may be prepared, for example, by melt-kneading the components (A) to (D) and optional other components.

The method used for the melt-kneading may be a method wherein the thermoplastic polyester resin (A), the methacrylate resin (B), the phosphor-containing flame retardants (C), the nitrogen-containing flame retardant (D), as well as various optionally added additives are preliminarily mixed and then fully melt kneaded in an extruder or the like, or a method wherein each component of given amount is fed by a metering feeder, such as loss-in-weight feeder, to an extruder or the like where it is melt-kneaded thoroughly.

Examples of the preliminary mixing include dry blending as well as a method wherein the mixing is conducted by using a mechanical blending apparatus such as tumble blender, ribbon mixer, or henschel mixer. The fiber reinforcement and the inorganic filler other than the fiber reinforcement may also be added by providing a side feeder between the breech area and the vent area of a multi-axial extruder such as biaxial extruder. In the case of a liquid additive, addition of the liquid additive may be conducted by providing a liquid addition nozzle between the breech area and the vent area of a multi-axial extruder such as biaxial extruder so that the feeding can be conducted by using a plunger pump, or by conducing the feeding from the breech area using a quantitative pump.

The flame-retardant thermoplastic polyester resin composition of the present invention is preferably pelletized before the molding. The pelletization may be accomplished, for example, by extruding the resin in strand form from extrusion from a monoaxial extruder, biaxial extruder, triaxial extruder, conical extruder, or kneader having "Uni-melt" or "Dulmage" type screw, and cutting the strand with a strand cutter.

Molded articles in film, fiber, or other shapes can be produced by melt molding of the flame-retardant thermoplastic polyester resin composition of the present invention. The methods used for the melt molding include injection molding, extrusion molding, blow molding, and the like, and the most preferred is injection molding.

The method known for the injection molding include gas assisted molding, bicolor molding, sandwich molding, in-mold molding, insert molding, and injection press molding in addition to the normal injection molding, and any of these method may be used in the present invention.

The molded article of the present invention preferably has a comparative tracking index of at least 400 V based on IEC 60112. An exemplary method for realizing the comparative tracking index of such range is molding of the flame-retardant thermoplastic polyester resin composition of the present invention by the method as described above.

The "IEC 60112" is the safety standard for tracking resistance of International Electrotechnical Commission (also known as IEC) revised in 2003, and the measurement can be conducted according to the measurement method of comparative tracking index of IEC 60112:2003 by using 0.1% ammonium chloride aqueous solution for the electrolyte solution. This standard is a safety standard for tracking failure which is a phenomenon that occurs on the resin surface when electric discharge is induced in some parts of the resin surface by the electric field and contaminants (electrolytes) such as dirt and dust deposited on the surface, and the heat caused in the electric discharge promotes decomposition and carbonization of the resin and the resin is finally ignited by the dielectric breakdown and local overheating of the surface. The resin material used near electric fields such as machine mechanical components, electric and electronic components, and automobile components are required to have a high level tracking resistance.

In the preferable embodiment, a layer of phosphor-containing flame retardants (the flame retardant layer) is formed to a depth of at least 20 nm from the outer surface in the burning of the molded article of the present invention. The thickness of the flame retardant layer formed in the burning may be determined by using a Time-of-Flight Secondary Ion Mass Spectrometer TOF.SIMS5 (manufactured by ION-TOF GmbH) (hereinafter also abbreviated as TOF-SIMS). The primary ion ($Bi_3^+$ (30 kV)) in the form of pulse is irradiated to the sample surface, and distribution of the time of the secondary ion discharged from the sample surface required for reaching the detector is measured to obtain mass distribution (mass spectrum) of the secondary ion. The organic and inorganic substances on the sample surface can be identified by analyzing the resulting mass spectrum of the secondary ion, and the information on the amount present on the surface can be obtained from the peak strength. Furthermore, simultaneous use of the ion beam exclusively for etching (Ar-GCIB (gas cluster ion) (5 kV)) enables analysis in the depth direction, and the analysis of the peaks corresponding to the thermoplastic polyester (A), the phosphor-containing flame retardant (C), and their decomposition products enables measurement of the thickness of the flame retardant layer. The thickness of the flame retardant layer is preferably at least 20 nm, more preferably at least 25 nm, and still more preferably at least 30 nm in view of improving the flame retardancy. The flame retardant layer can be formed to a thickness of at least 20 nm by combining the condensed phosphate ester (C-1) and the phosphazene compound (C-2) as the phosphor-containing flame retardant (C). In view of suppressing the bleed out, upper limit of the thickness of the flame retardant layer is preferably up to 100 nm, more preferably up to 90 nm, and still more preferably up to 80 nm.

The molded article of the present invention can be used for molded articles of mechanical machine components, electric components, electronic components, and automobile components by making use of the excellent mechanical properties such as tensile strength and elongation as well as heat resistance without sacrificing the high flame retardancy. In addition, the molded article of the present invention exhibits high tracking resistance, and such article is highly adapted for use as a component and device that is brought in contact with electricity.

Examples of the molded articles of machine mechanical components, electric components, electronic components, and automobile components include breaker, electromagnetic switch, focus case, flyback transformer, molded articles used in fixing unit of copying machines and printers, common home electric appliances, housing of OA equipment, casing component of variable capacitor, various terminal plates, transformer, printed circuit board, housing, terminal block, coil bobbins, connector, relay, chassis of disk drive, transformer, components of switches, components of plugs, components of motors, socket, plug, capacitor, various casings, resistor, electric and electronic components which will have a metal terminal or wire incorporated therein, computer-related components, acoustic components such as audio components, illumination components, electric appliance-related components, telephone appliance-related components, components of air conditioner, home appliances such as VTR and TV, components of copying machine, components of facsimile machine, components of optical appliances, components of automobile ignition device, connector for vehicles, and various electrical components for vehicles.

EXAMPLES

Next, the effects of the flame-retardant thermoplastic polyester resin composition of the present invention are described in detail by referring to Examples. The materials used in the Examples and Comparative Example are as described below. In the description, all "%" and "parts" are "% by weight" and "parts by weight" and "/" in the resin name indicates that the resin is a copolymer.

(A) Thermoplastic Polyester Resin
<A-1> Polybuthylene terephthalate resin
 "TORAYCON" (Registered Trademark) manufactured by TORAY INDUSTRIES, INC. was used. The intrinsic viscosity measured for the solution in o-chlorophenol at a temperature of 25° C. of the polybuthylene terephthalate resin was 0.80.
<A-2> Polybuthylene terephthalate resin
 "TORAYCON" (Registered Trademark) manufactured by TORAY INDUSTRIES, INC. was used. The intrinsic viscosity measured for the solution in o-chlorophenol at a temperature of 25° C. of the polybuthylene terephthalate resin was 1.00.
<A-3> Polyethylene terephthalate resin
 "MITSUI PET" (Registered Trademark) J005 manufactured by Mitsui Chemicals Inc. was used. The intrinsic viscosity measured for the solution in o-chlorophenol at a temperature of 25° C. of the polyethylene terephthalate resin was 0.63.
<A-4> Polypropylene terephthalate resin
 "Corterra" (Registered Trademark) CP509200 manufactured by Shell Chemicals Japan Ltd. was used. The intrinsic viscosity was 0.92.

(B) Methacrylate Resin
<B-1> Methacrylate resin ("SUMIPEX" (Registered Trademark) MHF manufactured by Sumitomo Chemical Co. Ltd.; weight average molecular weight, 95,000; MFR (230° C., 37.3N), 2 g/10 minutes; glass transition temperature, 115° C.; syndiotacticity, 47%)
<B-2> Methacrylate resin ("SUMIPEX" (Registered Trademark) LG35 manufactured by Sumitomo Chemical Co. Ltd.; weight average molecular weight, 100,000; MFR (230° C., 37.3N), 35 g/10 minutes; glass transition temperature, 90° C.; syndiotacticity, 39%)
(B') Methacryl copolymer resin wherein the methacrylate ester in the main structural unit is less than 50% by weight
<B'-1> Methyl methacrylate/styrene copolymer ("Estyrene" (Registered Trademark) MS-300 manufactured by NIPPON STEEL & SUMIKIN CHEMICAL CO., LTD.; methyl methacrylate/styrene=30% by weight/70% by weight)

(C) Phosphor-Containing Flame Retardant
(C-1) Condensed Phosphate
<C-1-1> 1,3-phenylene bis(di-2,6-xylenyl phosphate)
 PX-200 manufactured by DAIHACHI CHEMICAL INDUSTRY CO., LTD. was used.
<C-1-2> 4,4-bis(diphenylphosphoryl)-1,1-diphenyl
 FP-800 manufactured by ADEKA was used.
(C-2) Phosphazene Compound
<C-2-1> Crosslinked phenoxyphosphazene compound
 SPB-100 manufactured by Otsuka Chemical Co., Ltd. which is a compound prepared by crosslinking a cyclic phenoxy phosphazene represented by the general formula (1) (a mixture wherein "n" in the general formula (1) is 3 to 20) with p-phenylene group was used.
(C-3) Metal Salt of Organic Phosphine
<C-3-1> Metal salt of organic phosphine
 "Exolit" (Registered Trademark) OP-1240 manufactured by Clariant (Japan) K.K. was used.

(D) Nitrogen-Containing Flame Retardant
<D-1> Melamine cyanurate
MC-4000 manufactured by Nissan Chemical Industries, Ltd. (average particle size, 10 μm; white powder) was used.
(E) Aromatic Polycarbonate Resin
<E-1> Aromatic Polycarbonate Resin
A-2600 manufactured by Idemitsu Kosan Co., Ltd. was used.
(F) Alkaline Earth Metal Salt
<F-1> Calcium carbonate
KSS1000 manufactured by CALFINE Co., Ltd. was used.
<F-2> Partial calcium salt of montanic acid wax
"Licowax" (Registered Trademark) OP manufactured by Clariant (Japan) K.K. was used.
(G) Glass Fiber
<G-1> Glass fiber
Glass fiber 3J948 manufactured by Nitto Boseki Co., Ltd. in the form of chopped strand with fiber diameter of about 10 μm was used.
(H) Other Additives
<H-1> Long chain alkyl acid phosphate compound
"ADEKA STAB" (Registered Trademark) AX-71 manufactured by ADEKA was used.
<H-2> Vinyl resin
A silicone-acryl composite core-shell type rubber "METABLEN" (Registered Trademark) S-2001 manufactured by Mitsubishi Rayon Co., Ltd. was used.
<H-3> Vinyl resin
A methyl methacrylate/butadiene/styrene copolymer "PARALOID" (Registered Trademark) EXL-2603 manufactured by Dow Chemical Company was used.
<H-4> Hindered phenol antioxidant
Tetrakis[methylene-3-(3',5'-di-t-butyl-4'-hydroxyphenyl)propionate]methane "IRGANOX" (Registered Trademark) 1010 manufactured by BASF Japan Ltd. was used.
<H-5> Fluorine resin functioning as an anti-drip agent upon burning
Polytetrafluoroethylene, "Teflon" (Registered Trademark) 6-J manufactured by Du Pont-Mitsui Fluorochemicals Company, Ltd. was used.

[Measurement Procedures for Measuring the Properties]

In the Examples and Comparative Examples, the properties were evaluated by the measurement procedure as described below.

1. Tensile Properties

Dumbbell-shaped ASTM #1 test pieces for evaluating tensile properties having a test piece thickness of ⅛ inch (about 3.2 mm) were prepared by using an injection molding machine IS55EPN manufactured by Toshiba Machine Co., Ltd. When polybuthylene terephthalate resin was used for the component (A), the molding of test pieces was conducted under the temperature including a molding temperature of 250° C. and a mold temperature of 80° C., and when polyethylene terephthalate resin was used for the component (A), the molding of test pieces was conducted under the temperature including a molding temperature of 280° C. and a mold temperature of 80° C. When polypropylene terephthalate resin was used for the component (A), the molding of test pieces was conducted under the temperature including a molding temperature of 265° C. and a mold temperature of 80° C. The molding cycle used was 10 seconds of the injection time plus pressure retention time and 10 seconds of cooling time. Tensile breaking strength and tensile elongation at break were measured according to ASTMD 638 (2005) by using the resulting test pieces for evaluating the mechanical strength. The value is average of 3 measurements.

The materials having tensile elongation at break of less than 2.5% were evaluated to have an insufficient toughness, and the materials exhibiting high values of tensile breaking strength and tensile elongation at break were evaluated to have high toughness.

2. Heat Resistance

Dumbbell-shaped test pieces for evaluating heat distortion temperature having a test piece thickness of ⅛ inch (about 3.18 mm) were prepared by using an injection molding machine IS55EPN manufactured by Toshiba Machine Co., Ltd. under the same injection molding conditions as the "1. Tensile properties". The resulting test pieces for evaluating heat distortion temperature were evaluated for their heat distortion temperature according to ASTMD 648 (2005) under the measurement load of 1.82 MPa. The value is average of 3 measurements.

3. Flame Retardancy

Test pieces for flammability test having a test piece thickness of 1/32 inch (about 0.79 mm) were prepared by using an injection molding machine IS55EPN manufactured by Toshiba Machine Co., Ltd. under the same injection molding conditions as the "1. Tensile properties". The resulting test pieces for the flammability test were evaluated for their flame retardancy according to evaluation criteria defined in UL94 vertical test. The flame retardancy was rated in the order of V-0>V-1>V-2 (from superior to worth), and the test piece with inferior flame retardancy not reaching the standard of V-2, namely, not corresponding to any of the flame retardancy ratings as mentioned above were rated "substandard".

4. Bleed Out

Dumbbell-shaped ASTM #1 test pieces for evaluating tensile properties having a test piece thickness of ⅛ inch (about 3.2 mm) were prepared by using an injection molding machine IS55EPN manufactured by Toshiba Machine Co., Ltd. under the same injection molding conditions as the "1. Tensile properties". The resulting ASTM #1 test pieces were exposed to high temperature and humidity by placing in a constant temperature and humidity cabinet LHL-113 manufactured by ESPEC for 400 hours with the temperature and the humidity set at 80° C. and 95%. Bleed out was evaluated by visual inspection of the outer appearance of the molded article after the exposure to the high temperature and humidity by the following criteria. The molded articles with bleed out are articles with greatly reduced commercial value.

A: no liquid or white powdery bleed out is observed for the molded article.

B: liquid or white powdery bleed out is observed in some or many parts of the molded article.

5. Tracking Resistance

Injection molded square plates (80 mm×80 mm×thickness 3 mm) were produced by using an injection molding machine IS55EPN manufactured by Toshiba Machine Co., Ltd. under the conditions of the molding temperature of 250° C. and the mold temperature of 80° C. The resulting square plates were used to measure comparative tracking index according to method for measuring comparative tracking index of IEC 60112:2003 by using 0.1% ammonium chloride aqueous solution for the electrolyte solution.

6. Measurement of the Flame Retardant Layer Thickness

Injection molded square plates (80 mm×80 mm×thickness 3 mm) were produced by using an injection molding machine IS55EPN manufactured by Toshiba Machine Co., Ltd. under the conditions including the molding temperature of 250° C. and the mold temperature of 80° C. The resulting square plates were used in the measurement as described below. The square plate was fixed at a height of 30 cm from the ground so that the plate was parallel to the ground. Then, the central part of the lower surface of the square plate was burned for 5 seconds by using the burner and the flame as defined in UL94 vertical test with the burner gas outlet held at a position 20 mm from the lower surface of the square plate. The central part (200 μm×200 μm) of the burned side of the square plate was analyzed using a Time-of-Flight Secondary Ion Mass Spectrometer TOF.SIMS5 (manufactured by ION-TOF GmbH) by irradiating this part with the primary ion ($Bi_3^+$ (acceleration voltage, 30 kV)) in the form of pulse to measure distribution of the time required for the secondary ion discharged from the sample surface required to reach the detector to thereby obtain mass distribution (mass spectrum) of the secondary ion. In order to examine the mass spectrum profile in depth direction, the central part (600 μm×600 μm) of the burned side of the square plate is etched by using an ion beam exclusively used for etching purpose (Ar-GCIB (gas cluster ion) (acceleration voltage, 5 kV; cluster size (median), $Ar_{1500}$)), and the mass spectrum of the secondary ion in the central part (200 μm×200 μm) of the etched area was measured at an interval of 1 second of the etching time to thereby obtain the mass spectrum of the secondary ion at each etching depth. Strength of the $C_7H_4O_2^-$ peak which is the peak of the polybuthylene terephthalate (PBT) peak and the phosphoric acid compound ($PO_2^-$) peak which is the peak of the phosphor-containing flame retardant at the outermost surface and each etching depth was determined from the thus obtained mass spectrum of the secondary ion, and the strength was plotted in relation to the depth. It is to be noted that the square plates not undergoing the burning treatment were also subjected to the same measurement under the same conditions, and depth of the crater formed by the etching after the measurement was measured by using a probe surface roughness meter to calculate the etching speed, and the etching time was converted to the depth. In this process, the depth range where the strength of $PO^{2-}$ at an etching depth is 10 times or more of the strength of $C_7H_4O_2^-$ at that etching depth was defined as the flame retardant layer.

[Examples 1 to 52], [Comparative Examples 1 to 27]

A biaxial extruder having unidirectional rotating vent having a screw diameter of 30 mm and an L/D of 35 (TEX-30a manufactured by THE JAPAN STEEL WORKS, LTD.) was used. The thermoplastic polyester resin (A), the methacrylate resin (B), the phosphor-containing flame retardant (C), the nitrogen-containing flame retardant (D), and other optional components were mixed in the compositional ratio as shown in Tables 1 to 8, and the mixture was added from breech area of a biaxial extruder. The glass fiber (G) was added by providing a side feeder between the breech area and the vent area. The molten mixture was further blended under the extrusion conditions including a kneading temperature of 260° C. and a screw rotation of 150 rpm, and after extruding the composition in strand form, the strands were passed through a cooling bath and pelletized by a strand cutter.

The resulting pellets were dried in a hot air dryer at a temperature of 110° C. for 6 hours, and various molded articles were obtained by using an injection molding machine IS55EPN manufactured by Toshiba Machine Co., Ltd. The thus molded articles were evaluated for various values by the procedures as described above. The results are shown in Tables 1 to 8.

TABLE 1

| | | | Example | | | | | | | | | |
|---|---|---|---|---|---|---|---|---|---|---|---|---|
| | Symbol | Unit | 1 | 2 | 3 | 4 | 5 | 6 | 7 | 8 | 9 |
| (A) Thermoplastic polyester resin | A-1 | Part by weight | 95 | 80 | 0 | 0 | 0 | 80 | 50 | 80 | 80 |
| (A) Thermoplastic polyester resin | A-2 | Part by weight | 0 | 0 | 80 | 0 | 0 | 0 | 0 | 0 | 0 |
| (A) Thermoplastic polyester resin | A-3 | Part by weight | 0 | 0 | 0 | 80 | 0 | 0 | 0 | 0 | 0 |
| (A) Thermoplastic polyester resin | A-4 | Part by weight | 0 | 0 | 0 | 0 | 80 | 0 | 0 | 0 | 0 |
| (B) Methacrylate resin | B-1 | Part by weight | 5 | 20 | 20 | 20 | 20 | 0 | 50 | 20 | 20 |
| (B) Methacrylate resin | B-2 | Part by weight | 0 | 0 | 0 | 0 | 0 | 20 | 0 | 0 | 0 |
| Total content of (A) + (B) | — | Part by weight | 100 | 100 | 100 | 100 | 100 | 100 | 100 | 100 | 100 |
| (C-1) Condensed phosphate ester | C-1-1 | Part by weight | 13 | 13 | 13 | 13 | 13 | 13 | 13 | 0 | 0 |
| (C-1) Condensed phosphate ester | C-1-2 | Part by weight | 0 | 0 | 0 | 0 | 0 | 0 | 0 | 13 | 0 |
| (C-2) Phosphazene compound | C-2-1 | Part by weight | 0 | 0 | 0 | 0 | 0 | 0 | 0 | 0 | 13 |
| (C-3) Organic metal phosphinate | C-3-1 | Part by weight | 26 | 26 | 26 | 26 | 26 | 26 | 26 | 26 | 26 |
| (D) Nitrogen-containing flame retardant | D-1 | Part by weight | 10 | 10 | 10 | 10 | 10 | 10 | 10 | 10 | 10 |
| (E) Aromatic polycarbonate resin | E-1 | Part by weight | 0 | 0 | 0 | 0 | 0 | 0 | 0 | 0 | 0 |
| (F) Alkaline earth metal salt | F-1 | Part by weight | 0 | 0 | 0 | 0 | 0 | 0 | 0 | 0 | 0 |
| (F) Alkaline earth metal salt | F-2 | Part by weight | 0 | 0 | 0 | 0 | 0 | 0 | 0 | 0 | 0 |
| (G) Glass fiber | G-1 | Part by weight | 64 | 64 | 64 | 64 | 64 | 64 | 64 | 64 | 64 |
| (H) Other additives | H-1 | Part by weight | 0 | 0 | 0 | 0 | 0 | 0 | 0 | 0 | 0 |
| (H) Other additives | H-2 | Part by weight | 0 | 0 | 0 | 0 | 0 | 0 | 0 | 0 | 0 |
| (H) Other additives | H-3 | Part by weight | 0 | 0 | 0 | 0 | 0 | 0 | 0 | 0 | 0 |
| (H) Other additives | H-4 | Part by weight | 0 | 0 | 0 | 0 | 0 | 0 | 0 | 0 | 0 |
| (H) Other additives | H-5 | Part by weight | 0 | 0 | 0 | 0 | 0 | 0 | 0 | 0 | 0 |
| Total content of (C) | — | Part by weight | 39 | 39 | 39 | 39 | 39 | 39 | 39 | 39 | 39 |
| Content ratio of {(C-1) + (C-2)}/{(B) + (E)} | | | 72/28 | 39/61 | 39/61 | 39/61 | 39/61 | 39/61 | 21/79 | 39/61 | 39/61 |
| Content ratio of (C-1)/(C-2) | | | — | — | — | — | — | — | — | — | — |
| Tensile strength at break | | MPa | 106 | 101 | 103 | 113 | 107 | 100 | 93 | 104 | 103 |
| Tensile elongation at break | | % | 2.72 | 2.64 | 2.66 | 2.71 | 2.68 | 2.61 | 2.56 | 2.65 | 2.63 |
| Heat distortion temperature | | ° C. | 205 | 205 | 205 | 228 | 215 | 205 | 196 | 204 | 205 |
| Flammability rating | | Evaluation | V-0 | V-0 | V-0 | V-0 | V-0 | V-0 | V-2 | V-0 | V-0 |
| Bleed out (A: no, B: Yes) | | Visual inspection | B | A | A | A | A | A | A | A | A |
| Comparative tracking index | | V | 400 | 525 | 500 | 525 | 525 | 525 | 550 | 525 | 500 |

TABLE 2

| | Symbol | Unit | Example 10 | 11 | 12 | 13 | 14 | 15 | 16 | 17 | 18 |
|---|---|---|---|---|---|---|---|---|---|---|---|
| (A) Thermoplastic polyester resin | A-1 | Part by weight | 80 | 80 | 80 | 80 | 80 | 80 | 80 | 80 | 80 |
| (A) Thermoplastic polyester resin | A-2 | Part by weight | 0 | 0 | 0 | 0 | 0 | 0 | 0 | 0 | 0 |
| (A) Thermoplastic polyester resin | A-3 | Part by weight | 0 | 0 | 0 | 0 | 0 | 0 | 0 | 0 | 0 |
| (A) Thermoplastic polyester resin | A-4 | Part by weight | 0 | 0 | 0 | 0 | 0 | 0 | 0 | 0 | 0 |
| (B) Methacrylate resin | B-1 | Part by weight | 20 | 20 | 20 | 20 | 20 | 20 | 20 | 20 | 20 |
| (B) Methacrylate resin | B-2 | Part by weight | 0 | 0 | 0 | 0 | 0 | 0 | 0 | 0 | 0 |
| Total content of (A) + (B) | — | Part by weight | 100 | 100 | 100 | 100 | 100 | 100 | 100 | 100 | 100 |
| (C-1) Condensed phosphate ester | C-1-1 | Part by weight | 6 | 20 | 4 | 19 | 13 | 13 | 13 | 13 | 13 |
| (C-1) Condensed phosphate ester | C-1-2 | Part by weight | 0 | 0 | 0 | 0 | 0 | 0 | 0 | 0 | 0 |
| (C-2) Phosphazene compound | C-2-1 | Part by weight | 0 | 0 | 0 | 0 | 0 | 0 | 0 | 0 | 0 |
| (C-3) Organic metal phosphinate | C-3-1 | Part by weight | 13 | 45 | 35 | 20 | 26 | 26 | 26 | 26 | 26 |
| (D) Nitrogen-containing flame retardant | D-1 | Part by weight | 10 | 10 | 10 | 10 | 10 | 10 | 10 | 10 | 10 |
| (E) Aromatic polycarbonate resin | E-1 | Part by weight | 0 | 0 | 0 | 0 | 0 | 0 | 0 | 0 | 0 |
| (F) Alkaline earth metal salt | F-1 | Part by weight | 0 | 0 | 0 | 0 | 0.6 | 0 | 10 | 0 | 0 |
| (F) Alkaline earth metal salt | F-2 | Part by weight | 0 | 0 | 0 | 0 | 0 | 0.6 | 0 | 0 | 0 |
| (G) Glass fiber | G-1 | Part by weight | 64 | 64 | 64 | 64 | 64 | 64 | 64 | 0 | 64 |
| (H) Other additives | H-1 | Part by weight | 0 | 0 | 0 | 0 | 0 | 0 | 0 | 0 | 0 |
| (H) Other additives | H-2 | Part by weight | 0 | 0 | 0 | 0 | 0 | 0 | 0 | 0 | 0 |
| (H) Other additives | H-3 | Part by weight | 0 | 0 | 0 | 0 | 0 | 0 | 0 | 0 | 0 |
| (H) Other additives | H-4 | Part by weight | 0 | 0 | 0 | 0 | 0 | 0 | 0 | 0 | 0 |
| (H) Other additives | H-5 | Part by weight | 0 | 0 | 0 | 0 | 0 | 0 | 0 | 0 | 0.3 |
| Total content of (C) | — | Part by weight | 19 | 65 | 39 | 39 | 39 | 39 | 39 | 39 | 39 |
| Content ratio of {(C-1) + (C-2)}/{(B) + (E)} | | | 23/77 | 50/50 | 17/83 | 49/51 | 39/61 | 39/61 | 39/61 | 39/61 | 39/61 |
| Content ratio of (C-1)/(C-2) | | | — | — | — | — | — | — | — | — | — |
| Tensile strength at break | | MPa | 107 | 93 | 97 | 103 | 103 | 100 | 99 | 45 | 102 |
| Tensile elongation at break | | % | 2.72 | 2.52 | 2.56 | 2.67 | 2.63 | 2.65 | 2.51 | 2.84 | 2.65 |
| Heat distortion temperature | | °C. | 205 | 207 | 206 | 205 | 205 | 204 | 206 | 59 | 206 |
| Flammability rating | | Evaluation | V-2 | V-0 | V-0 | V-1 | V-0 | V-0 | V-0 | V-0 | V-0 |
| Bleed out (A: no, B: Yes) | | Visual inspection | A | A | A | A | A | A | A | A | A |
| Comparative tracking index | | V | 525 | 525 | 525 | 525 | 600 | 550 | 600 | 600 | 550 |

TABLE 3

| | Symbol | Unit | Example 19 | 20 | 21 | 22 | 23 | 24 |
|---|---|---|---|---|---|---|---|---|
| (A) Thermoplastic polyester resin | A-1 | Part by weight | 95 | 80 | 0 | 0 | 0 | 80 |
| (A) Thermoplastic polyester resin | A-2 | Part by weight | 0 | 0 | 80 | 0 | 0 | 0 |
| (A) Thermoplastic polyester resin | A-3 | Part by weight | 0 | 0 | 0 | 80 | 0 | 0 |
| (A) Thermoplastic polyester resin | A-4 | Part by weight | 0 | 0 | 0 | 0 | 80 | 0 |
| (B) Methacrylate resin | B-1 | Part by weight | 5 | 20 | 20 | 20 | 20 | 0 |
| (B) Methacrylate resin | B-2 | Part by weight | 0 | 0 | 0 | 0 | 0 | 20 |
| Total content of (A) + (B) | — | Part by weight | 100 | 100 | 100 | 100 | 100 | 100 |
| (C-1) Condensed phosphate ester | C-1-1 | Part by weight | 24 | 24 | 24 | 24 | 24 | 24 |
| (C-1) Condensed phosphate ester | C-1-2 | Part by weight | 0 | 0 | 0 | 0 | 0 | 0 |
| (C-2) Phosphazene compound | C-2-1 | Part by weight | 24 | 24 | 24 | 24 | 24 | 24 |
| (C-3) Organic metal phosphinate | C-3-1 | Part by weight | 0 | 0 | 0 | 0 | 0 | 0 |
| (D) Nitrogen-containing flame retardant | D-1 | Part by weight | 72 | 72 | 72 | 72 | 72 | 72 |
| (E) Aromatic polycarbonate resin | E-1 | Part by weight | 35 | 35 | 35 | 35 | 35 | 35 |
| (F) Alkaline earth metal salt | F-1 | Part by weight | 0 | 0 | 0 | 0 | 0 | 0 |
| (F) Alkaline earth metal salt | F-2 | Part by weight | 0 | 0 | 0 | 0 | 0 | 0 |
| (G) Glass fiber | G-1 | Part by weight | 120 | 120 | 120 | 120 | 120 | 120 |
| (H) Other additives | H-1 | Part by weight | 0 | 0 | 0 | 0 | 0 | 0 |
| (H) Other additives | H-2 | Part by weight | 0 | 0 | 0 | 0 | 0 | 0 |
| (H) Other additives | H-3 | Part by weight | 0 | 0 | 0 | 0 | 0 | 0 |
| (H) Other additives | H-4 | Part by weight | 0 | 0 | 0 | 0 | 0 | 0 |
| (H) Other additives | H-5 | Part by weight | 0 | 0 | 0 | 0 | 0 | 0 |
| Total content of (C) | — | Part by weight | 48 | 48 | 48 | 48 | 48 | 48 |
| Content ratio of {(C-1) + (C-2)}/{(B) + (E)} | | | 55/45 | 47/53 | 47/53 | 47/53 | 47/53 | 47/53 |
| Content ratio of (C-1)/(C-2) | | | 50/50 | 50/50 | 50/50 | 50/50 | 50/50 | 50/50 |
| Tensile strength at break | | MPa | 111 | 110 | 113 | 118 | 115 | 108 |
| Tensile elongation at break | | % | 2.65 | 2.63 | 2.64 | 2.70 | 2.67 | 2.60 |
| Heat distortion temperature | | °C. | 186 | 185 | 186 | 198 | 192 | 184 |
| Flammability rating | | Evaluation | V-0 | V-0 | V-0 | V-0 | V-0 | V-0 |

TABLE 3-continued

| | | | | | | | |
|---|---|---|---|---|---|---|---|
| Bleed out (A: no, B: Yes) | Visual inspection | B | A | A | A | A | A |
| Comparative tracking index | V | 425 | 525 | 500 | 525 | 525 | 525 |

| | Symbol | Unit | Example 25 | Example 26 | Example 27 | Example 28 | Example 29 |
|---|---|---|---|---|---|---|---|
| (A) Thermoplastic polyester resin | A-1 | Part by weight | 50 | 80 | 80 | 80 | 80 |
| (A) Thermoplastic polyester resin | A-2 | Part by weight | 0 | 0 | 0 | 0 | 0 |
| (A) Thermoplastic polyester resin | A-3 | Part by weight | 0 | 0 | 0 | 0 | 0 |
| (A) Thermoplastic polyester resin | A-4 | Part by weight | 0 | 0 | 0 | 0 | 0 |
| (B) Methacrylate resin | B-1 | Part by weight | 50 | 20 | 20 | 20 | 20 |
| (B) Methacrylate resin | B-2 | Part by weight | 0 | 0 | 0 | 0 | 0 |
| Total content of (A) + (B) | — | Part by weight | 100 | 100 | 100 | 100 | 100 |
| (C-1) Condensed phosphate ester | C-1-1 | Part by weight | 24 | 24 | 0 | 0 | 24 |
| (C-1) Condensed phosphate ester | C-1-2 | Part by weight | 0 | 0 | 24 | 0 | 0 |
| (C-2) Phosphazene compound | C-2-1 | Part by weight | 24 | 0 | 24 | 24 | 0 |
| (C-3) Organic metal phosphinate | C-3-1 | Part by weight | 0 | 0 | 0 | 24 | 24 |
| (D) Nitrogen-containing flame retardant | D-1 | Part by weight | 72 | 72 | 72 | 72 | 72 |
| (E) Aromatic polycarbonate resin | E-1 | Part by weight | 35 | 35 | 35 | 35 | 35 |
| (F) Alkaline earth metal salt | F-1 | Part by weight | 0 | 0 | 0 | 0 | 0 |
| (F) Alkaline earth metal salt | F-2 | Part by weight | 0 | 0 | 0 | 0 | 0 |
| (G) Glass fiber | G-1 | Part by weight | 120 | 120 | 120 | 120 | 120 |
| (H) Other additives | H-1 | Part by weight | 0 | 0 | 0 | 0 | 0 |
| (H) Other additives | H-2 | Part by weight | 0 | 0 | 0 | 0 | 0 |
| (H) Other additives | H-3 | Part by weight | 0 | 0 | 0 | 0 | 0 |
| (H) Other additives | H-4 | Part by weight | 0 | 0 | 0 | 0 | 0 |
| (H) Other additives | H-5 | Part by weight | 0 | 0 | 0 | 0 | 0 |
| Total content of (C) | — | Part by weight | 48 | 48 | 48 | 48 | 48 |
| Content ratio of {(C-1) + (C-2)}/{(B) + (E)} | | | 36/64 | 47/53 | 47/53 | 30/70 | 30/70 |
| Content ratio of (C-1)/(C-2) | | | 50/50 | — | 50/50 | — | — |
| Tensile strength at break | | MPa | 104 | 104 | 110 | 107 | 104 |
| Tensile elongation at break | | % | 2.53 | 2.60 | 2.62 | 2.55 | 2.54 |
| Heat distortion temperature | | °C. | 180 | 184 | 185 | 190 | 189 |
| Flammability rating | | Evaluation | V-2 | V-1 | V-0 | V-0 | V-0 |
| Bleed out (A: no, B: Yes) | | Visual inspection | A | A | A | A | A |
| Comparative tracking index | | V | 550 | 500 | 525 | 500 | 500 |

TABLE 4

| | Symbol | Unit | Example 30 | Example 31 | Example 32 | Example 33 | Example 34 | Example 35 |
|---|---|---|---|---|---|---|---|---|
| (A) Thermoplastic polyester resin | A-1 | Part by weight | 80 | 80 | 80 | 80 | 80 | 80 |
| (A) Thermoplastic polyester resin | A-2 | Part by weight | 0 | 0 | 0 | 0 | 0 | 0 |
| (A) Thermoplastic polyester resin | A-3 | Part by weight | 0 | 0 | 0 | 0 | 0 | 0 |
| (A) Thermoplastic polyester resin | A-4 | Part by weight | 0 | 0 | 0 | 0 | 0 | 0 |
| (B) Methacrylate resin | B-1 | Part by weight | 20 | 20 | 20 | 20 | 20 | 20 |
| (B) Methacrylate resin | B-2 | Part by weight | 0 | 0 | 0 | 0 | 0 | 0 |
| Total content of (A) + (B) | — | Part by weight | 100 | 100 | 100 | 100 | 100 | 100 |
| (C-1) Condensed phosphate ester | C-1-1 | Part by weight | 19 | 29 | 10 | 38 | 5 | 43 |
| (C-1) Condensed phosphate ester | C-1-2 | Part by weight | 0 | 0 | 0 | 0 | 0 | 0 |
| (C-2) Phosphazene compound | C-2-1 | Part by weight | 29 | 19 | 38 | 10 | 43 | 5 |
| (C-3) Organic metal phosphinate | C-3-1 | Part by weight | 0 | 0 | 0 | 0 | 0 | 0 |
| (D) Nitrogen-containing flame retardant | D-1 | Part by weight | 72 | 72 | 72 | 72 | 72 | 72 |
| (E) Aromatic polycarbonate resin | E-1 | Part by weight | 35 | 35 | 35 | 35 | 35 | 35 |
| (F) Alkaline earth metal salt | F-1 | Part by weight | 0 | 0 | 0 | 0 | 0 | 0 |
| (F) Alkaline earth metal salt | F-2 | Part by weight | 0 | 0 | 0 | 0 | 0 | 0 |
| (G) Glass fiber | G-1 | Part by weight | 120 | 120 | 120 | 120 | 120 | 120 |
| (H) Other additives | H-1 | Part by weight | 0 | 0 | 0 | 0 | 0 | 0 |
| (H) Other additives | H-2 | Part by weight | 0 | 0 | 0 | 0 | 0 | 0 |
| (H) Other additives | H-3 | Part by weight | 0 | 0 | 0 | 0 | 0 | 0 |
| (H) Other additives | H-4 | Part by weight | 0 | 0 | 0 | 0 | 0 | 0 |
| (H) Other additives | H-5 | Part by weight | 0 | 0 | 0 | 0 | 0 | 0 |
| Total content of (C) | — | Part by weight | 48 | 48 | 48 | 48 | 48 | 48 |
| Content ratio of {(C-1) + (C-2)}/{(B) + (E)} | | | 47/53 | 47/53 | 47/53 | 47/53 | 47/53 | 47/53 |
| Content ratio of (C-1)/(C-2) | | | 40/60 | 60/40 | 21/79 | 79/21 | 10/90 | 90/10 |
| Tensile strength at break | | MPa | 109 | 111 | 108 | 110 | 109 | 110 |
| Tensile elongation at break | | % | 2.64 | 2.61 | 2.63 | 2.60 | 2.62 | 2.64 |
| Heat distortion temperature | | °C. | 186 | 185 | 185 | 185 | 185 | 185 |
| Flammability rating | | Evaluation | V-0 | V-0 | V-1 | V-1 | V-2 | V-2 |
| Bleed out (A: no, B: Yes) | | Visual inspection | A | A | A | A | A | A |
| Comparative tracking index | | V | 525 | 525 | 500 | 475 | 475 | 475 |

TABLE 4-continued

|  | Symbol | Unit | Example 36 | Example 37 | Example 38 | Example 39 | Example 40 |
|---|---|---|---|---|---|---|---|
| (A) Thermoplastic polyester resin | A-1 | Part by weight | 80 | 80 | 80 | 80 | 80 |
| (A) Thermoplastic polyester resin | A-2 | Part by weight | 0 | 0 | 0 | 0 | 0 |
| (A) Thermoplastic polyester resin | A-3 | Part by weight | 0 | 0 | 0 | 0 | 0 |
| (A) Thermoplastic polyester resin | A-4 | Part by weight | 0 | 0 | 0 | 0 | 0 |
| (B) Methacrylate resin | B-1 | Part by weight | 20 | 20 | 20 | 20 | 20 |
| (B) Methacrylate resin | B-2 | Part by weight | 0 | 0 | 0 | 0 | 0 |
| Total content of (A) + (B) | — | Part by weight | 100 | 100 | 100 | 100 | 100 |
| (C-1) Condensed phosphate ester | C-1-1 | Part by weight | 5 | 43 | 24 | 24 | 24 |
| (C-1) Condensed phosphate ester | C-1-2 | Part by weight | 43 | 5 | 0 | 0 | 0 |
| (C-2) Phosphazene compound | C-2-1 | Part by weight | 0 | 0 | 24 | 24 | 24 |
| (C-3) Organic metal phosphinate | C-3-1 | Part by weight | 0 | 0 | 0 | 0 | 0 |
| (D) Nitrogen-containing flame retardant | D-1 | Part by weight | 72 | 72 | 72 | 72 | 72 |
| (E) Aromatic polycarbonate resin | E-1 | Part by weight | 35 | 35 | 35 | 35 | 35 |
| (F) Alkaline earth metal salt | F-1 | Part by weight | 0 | 0 | 1.2 | 0 | 10 |
| (F) Alkaline earth metal salt | F-2 | Part by weight | 0 | 0 | 0 | 1.2 | 0 |
| (G) Glass fiber | G-1 | Part by weight | 120 | 120 | 120 | 120 | 120 |
| (H) Other additives | H-1 | Part by weight | 0 | 0 | 0 | 0 | 0 |
| (H) Other additives | H-2 | Part by weight | 0 | 0 | 0 | 0 | 0 |
| (H) Other additives | H-3 | Part by weight | 0 | 0 | 0 | 0 | 0 |
| (H) Other additives | H-4 | Part by weight | 0 | 0 | 0 | 0 | 0 |
| (H) Other additives | H-5 | Part by weight | 0 | 0 | 0 | 0 | 0 |
| Total content of (C) | — | Part by weight | 48 | 48 | 48 | 48 | 48 |
| Content ratio of {(C-1) + (C-2)}/{(B) + (E)} |  |  | 47/53 | 47/53 | 47/53 | 47/53 | 47/53 |
| Content ratio of (C-1)/(C-2) |  |  | — | — | 50/50 | 50/50 | 50/50 |
| Tensile strength at break |  | MPa | 105 | 104 | 109 | 110 | 100 |
| Tensile elongation at break |  | % | 2.58 | 2.59 | 2.59 | 2.60 | 2.51 |
| Heat distortion temperature |  | ° C. | 184 | 184 | 184 | 185 | 184 |
| Flammability rating |  | Evaluation | V-2 | V-2 | V-0 | V-0 | V-0 |
| Bleed out (A: no, B: Yes) |  | Visual inspection | A | A | A | A | A |
| Comparative tracking index |  | V | 450 | 475 | 600 | 550 | 600 |

TABLE 5

|  | Symbol | Unit | Example 41 | 42 | 43 | 44 | 45 | 46 | 47 | 48 | 49 | 50 |
|---|---|---|---|---|---|---|---|---|---|---|---|---|
| (A) Thermoplastic polyester resin | A-1 | Part by weight | 80 | 80 | 80 | 50 | 80 | 80 | 80 | 80 | 80 | 80 |
| (A) Thermoplastic polyester resin | A-2 | Part by weight | 0 | 0 | 0 | 0 | 0 | 0 | 0 | 0 | 0 | 0 |
| (A) Thermoplastic polyester resin | A-3 | Part by weight | 0 | 0 | 0 | 0 | 0 | 0 | 0 | 0 | 0 | 0 |
| (A) Thermoplastic polyester resin | A-4 | Part by weight | 0 | 0 | 0 | 0 | 0 | 0 | 0 | 0 | 0 | 0 |
| (B) Methacrylate resin | B-1 | Part by weight | 20 | 20 | 20 | 50 | 20 | 20 | 20 | 20 | 20 | 20 |
| (B) Methacrylate resin | B-2 | Part by weight | 0 | 0 | 0 | 0 | 0 | 0 | 0 | 0 | 0 | 0 |
| Total content of (A) + (B) | — | Part by weight | 100 | 100 | 100 | 100 | 100 | 100 | 100 | 100 | 100 | 100 |
| (C-1) Condensed phosphate ester | C-1-1 | Part by weight | 24 | 24 | 20 | 20 | 24 | 24 | 24 | 24 | 24 | 24 |
| (C-1) Condensed phosphate ester | C-1-2 | Part by weight | 0 | 0 | 0 | 0 | 0 | 0 | 0 | 0 | 0 | 0 |
| (C-2) Phosphazene compound | C-2-1 | Part by weight | 24 | 24 | 20 | 20 | 24 | 24 | 24 | 24 | 24 | 24 |
| (C-3) Organic metal phosphinate | C-3-1 | Part by weight | 0 | 0 | 0 | 0 | 0 | 0 | 0 | 0 | 0 | 0 |
| (D) Nitrogen-containing flame retardant | D-1 | Part by weight | 72 | 72 | 72 | 72 | 72 | 72 | 72 | 72 | 72 | 72 |
| (E) Aromatic polycarbonate resin | E-1 | Part by weight | 0 | 60 | 35 | 50 | 35 | 35 | 35 | 35 | 35 | 35 |
| (F) Alkaline earth metal salt | F-1 | Part by weight | 0 | 0 | 0 | 0 | 0 | 0 | 0 | 0 | 0 | 0 |
| (F) Alkaline earth metal salt | F-2 | Part by weight | 0 | 0 | 0 | 0 | 0 | 0 | 0 | 0 | 0 | 0 |
| (G) Glass fiber | G-1 | Part by weight | 120 | 120 | 120 | 120 | 0 | 120 | 120 | 120 | 120 | 120 |
| (H) Other additives | H-1 | Part by weight | 0 | 0 | 0 | 0 | 0 | 0.3 | 0 | 0 | 0 | 0 |
| (H) Other additives | H-2 | Part by weight | 0 | 0 | 0 | 0 | 0 | 0 | 5 | 0 | 0 | 0 |
| (H) Other additives | H-3 | Part by weight | 0 | 0 | 0 | 0 | 0 | 0 | 0 | 5 | 0 | 0 |
| (H) Other additives | H-4 | Part by weight | 0 | 0 | 0 | 0 | 0 | 0 | 0 | 0 | 0.3 | 0 |
| (H) Other additives | H-5 | Part by weight | 0 | 0 | 0 | 0 | 0 | 0 | 0 | 0 | 0 | 0.3 |
| Total content of (C) | — | Part by weight | 48 | 48 | 40 | 40 | 48 | 48 | 48 | 48 | 48 | 48 |
| Content ratio of {(C-1) + (C-2)}/{(B) + (E)} |  |  | 71/29 | 38/62 | 42/58 | 29/71 | 47/53 | 47/53 | 47/53 | 47/53 | 47/53 | 47/53 |
| Content ratio of (C-1)/(C-2) |  |  | 50/50 | 50/50 | 50/50 | 50/50 | 50/50 | 50/50 | 50/50 | 50/50 | 50/50 | 50/50 |

TABLE 5-continued

|  | Symbol | Unit | Example |  |  |  |  |  |  |  |  |  |
|---|---|---|---|---|---|---|---|---|---|---|---|---|
|  |  |  | 41 | 42 | 43 | 44 | 45 | 46 | 47 | 48 | 49 | 50 |
| Tensile strength at break |  | MPa | 103 | 113 | 112 | 108 | 46 | 109 | 108 | 109 | 110 | 109 |
| Tensile elongation at break |  | % | 2.53 | 2.69 | 2.64 | 2.64 | 2.53 | 2.63 | 2.70 | 2.74 | 2.62 | 2.59 |
| Heat distortion temperature |  | ° C. | 184 | 186 | 186 | 183 | 65 | 187 | 185 | 185 | 185 | 185 |
| Flammability rating |  | Evaluation | V-1 | V-0 | V-1 | V-2 | V-0 | V-0 | V-0 | V-0 | V-0 | V-0 |
| Bleed out (A: no, B: Yes) |  | Visual inspection | B | A | A | A | A | A | A | A | A | A |
| Comparative tracking index |  | V | 575 | 400 | 525 | 450 | 600 | 525 | 525 | 525 | 525 | 525 |

TABLE 6

| | Symbol | Unit | Comparative Example 1 | 2 | 3 | 4 | 5 | 6 | 7 | 8 | 9 | 10 | 11 | 12 |
|---|---|---|---|---|---|---|---|---|---|---|---|---|---|---|
| (A) Thermoplastic polyester resin | A-1 | Part by weight | 99 | 30 | 80 | 80 | 80 | 80 | 80 | 80 | 80 | 80 | 80 | 80 |
| (A) Thermoplastic polyester resin | A-2 | Part by weight | 0 | 0 | 0 | 0 | 0 | 0 | 0 | 0 | 0 | 0 | 0 | 0 |
| (A) Thermoplastic polyester resin | A-3 | Part by weight | 0 | 0 | 0 | 0 | 0 | 0 | 0 | 0 | 0 | 0 | 0 | 0 |
| (A) Thermoplastic polyester resin | A-4 | Part by weight | 0 | 0 | 0 | 0 | 0 | 0 | 0 | 0 | 0 | 0 | 0 | 0 |
| (B) Methacrylate resin | B-1 | Part by weight | 1 | 70 | 20 | 20 | 20 | 20 | 20 | 20 | 20 | 20 | 20 | 0 |
| (B) Methacrylate resin | B-2 | Part by weight | 0 | 0 | 0 | 0 | 0 | 0 | 0 | 0 | 0 | 0 | 0 | 0 |
| (B') Methacryl copolymer resin | B'-1 | Part by weight | 0 | 0 | 0 | 0 | 0 | 0 | 0 | 0 | 0 | 0 | 0 | 20 |
| Total content of (A) + (B) | — | | 100 | 100 | 100 | 100 | 100 | 100 | 100 | 100 | 100 | 100 | 100 | 100 |
| (C-1) Condensed phosphate ester | C-1-1 | Part by weight | 13 | 13 | 39 | 0 | 0 | 0 | 0 | 13 | 64 | 13 | 13 | 13 |
| (C-1) Condensed phosphate ester | C-1-2 | Part by weight | 0 | 0 | 0 | 39 | 39 | 0 | 0 | 0 | 0 | 0 | 0 | 0 |
| (C-2) Phosphazene compound | C-2-1 | Part by weight | 0 | 0 | 0 | 0 | 0 | 39 | 0 | 0 | 0 | 0 | 0 | 0 |
| (C-3) Organic metal phosphinate | C-3-1 | Part by weight | 26 | 26 | 0 | 0 | 0 | 0 | 0 | 77 | 26 | 26 | 26 | 26 |
| (D) Nitrogen-containing flame retardant | D-1 | Part by weight | 10 | 10 | 10 | 10 | 10 | 10 | 10 | 10 | 10 | 0 | 100 | 10 |
| (E) Aromatic polycarbonate resin | E-1 | Part by weight | 0 | 0 | 0 | 0 | 0 | 0 | 0 | 0 | 0 | 0 | 0 | 0 |
| (F) Alkaline earth metal salt | F-1 | Part by weight | 0 | 0 | 0 | 0 | 0 | 0 | 0 | 0 | 0 | 0 | 0 | 0 |
| (F) Alkaline earth metal salt | F-2 | Part by weight | 0 | 0 | 0 | 0 | 0 | 0 | 0 | 0 | 0 | 0 | 0 | 0 |
| (G) Glass fiber | G-1 | Part by weight | 64 | 64 | 64 | 64 | 64 | 64 | 64 | 64 | 64 | 64 | 64 | 64 |
| (H) Other additives | H-1 | Part by weight | 0 | 0 | 0 | 0 | 0 | 0 | 0 | 0 | 0 | 0 | 0 | 0 |
| (H) Other additives | H-2 | Part by weight | 0 | 0 | 0 | 0 | 0 | 0 | 0 | 0 | 0 | 0 | 0 | 0 |
| (H) Other additives | H-3 | Part by weight | 0 | 0 | 0 | 0 | 0 | 0 | 0 | 0 | 0 | 0 | 0 | 0 |
| (H) Other additives | H-4 | Part by weight | 0 | 0 | 0 | 0 | 0 | 0 | 0 | 0 | 0 | 0 | 0 | 0 |
| (H) Other additives | H-5 | Part by weight | 0 | 0 | 0 | 0 | 0 | 0 | 0 | 0 | 0 | 0 | 0 | 0 |
| Total content of (C) | — | Part by weight | 39 | 39 | 39 | 39 | 39 | 39 | 0 | 90 | 90 | 39 | 39 | 39 |
| Content ratio of {(C-1) + (C-2)}/{(B) + (E)} | | | 93/7 | 16/84 | 66/34 | 66/34 | 66/34 | 0/100 | 0/100 | 39/61 | 76/24 | 39/61 | 39/61 | — |
| Content ratio of (C-1)/(C-2) | | | — | — | — | — | — | — | — | — | — | — | — | — |
| Tensile strength at break | | MPa | 105 | 91 | 107 | 108 | 107 | 94 | 112 | 92 | 92 | 109 | 87 | 95 |
| Tensile elongation at break | | % | 2.71 | 2.46 | 2.70 | 2.69 | 2.66 | 2.44 | 2.81 | 2.32 | 2.44 | 2.74 | 2.13 | 2.39 |
| Heat distortion temperature | | °C. | 207 | 195 | 199 | 198 | 200 | 209 | 201 | 209 | 194 | 201 | 211 | 192 |
| Flammability rating | | Evaluation | V-0 | Substandard | Substandard | Substandard | Substandard | V-1 | Substandard | V-0 | V-0 | Substandard | V-0 | Substandard |
| Bleed out (A: no, B: Yes) | | Visual inspection | B | A | B | B | B | A | A | A | B | A | A | B |
| Comparative tracking index | | V | 325 | 550 | 525 | 500 | 500 | 475 | 500 | 475 | 500 | 500 | 525 | 475 |

TABLE 7

| | Symbol | Unit | Comparative Example | | | | | | | | | | |
|---|---|---|---|---|---|---|---|---|---|---|---|---|---|
| | | | 13 | 14 | 15 | 16 | 17 | 18 | 19 | 20 | 21 | 22 | 23 |
| (A) Thermoplastic polyester resin | A-1 | Part by weight | 99 | 30 | 80 | 80 | 80 | 80 | 80 | 80 | 80 | 80 | 80 |
| (A) Thermoplastic polyester resin | A-2 | Part by weight | 0 | 0 | 0 | 0 | 0 | 0 | 0 | 0 | 0 | 0 | 0 |
| (A) Thermoplastic polyester resin | A-3 | Part by weight | 0 | 0 | 0 | 0 | 0 | 0 | 0 | 0 | 0 | 0 | 0 |
| (A) Thermoplastic polyester resin | A-4 | Part by weight | 0 | 0 | 0 | 0 | 0 | 0 | 0 | 0 | 0 | 0 | 0 |
| (B) Methacrylate resin | B-1 | Part by weight | 1 | 70 | 20 | 20 | 20 | 20 | 20 | 20 | 20 | 20 | 0 |
| (B) Methacrylate resin | B-2 | Part by weight | 0 | 0 | 0 | 0 | 0 | 0 | 0 | 0 | 0 | 0 | 0 |
| (B') Methacryl copolymer resin | B'-1 | Part by weight | 0 | 0 | 0 | 0 | 0 | 0 | 0 | 0 | 0 | 0 | 20 |
| Total content of (A) + (B) | — | Part by weight | 100 | 100 | 100 | 100 | 100 | 100 | 100 | 100 | 100 | 100 | 100 |
| (C-1) Condensed phosphate ester | C-1-1 | Part by weight | 24 | 24 | 48 | 0 | 0 | 0 | 66 | 24 | 24 | 24 | 24 |
| (C-1) Condensed phosphate ester | C-1-2 | Part by weight | 0 | 0 | 0 | 48 | 0 | 0 | 0 | 0 | 0 | 0 | 0 |
| (C-2) Phosphazene compound | C-2-1 | Part by weight | 24 | 24 | 0 | 0 | 48 | 0 | 24 | 66 | 24 | 24 | 24 |
| (C-3) Organic metal phosphinate | C-3-1 | Part by weight | 0 | 0 | 0 | 0 | 0 | 0 | 0 | 0 | 0 | 0 | 0 |
| (D) Nitrogen-containing flame retardant | D-1 | Part by weight | 72 | 72 | 72 | 72 | 72 | 72 | 72 | 72 | 0 | 0 | 72 |
| (E) Aromatic polycarbonate resin | E-1 | Part by weight | 35 | 35 | 35 | 35 | 35 | 35 | 35 | 35 | 35 | 35 | 35 |
| (F) Alkaline earth metal salt | F-1 | Part by weight | 0 | 0 | 0 | 0 | 0 | 0 | 0 | 0 | 0 | 0 | 0 |
| (F) Alkaline earth metal salt | F-2 | Part by weight | 0 | 0 | 0 | 0 | 0 | 0 | 0 | 0 | 0 | 0 | 0 |
| (G) Glass fiber | G-1 | Part by weight | 120 | 120 | 120 | 120 | 120 | 120 | 120 | 120 | 120 | 120 | 120 |
| (H) Other additives | H-1 | Part by weight | 0 | 0 | 0 | 0 | 0 | 0 | 0 | 0 | 0 | 0 | 0 |
| (H) Other additives | H-2 | Part by weight | 0 | 0 | 0 | 0 | 0 | 0 | 0 | 0 | 0 | 0 | 0 |
| (H) Other additives | H-3 | Part by weight | 0 | 0 | 0 | 0 | 0 | 0 | 0 | 0 | 0 | 0 | 0 |
| (H) Other additives | H-4 | Part by weight | 0 | 0 | 0 | 0 | 0 | 0 | 0 | 0 | 0 | 0 | 0 |
| (H) Other additives | H-5 | Part by weight | 0 | 0 | 0 | 0 | 0 | 0 | 0 | 0 | 0 | 0 | 0 |
| Total content of (C) | — | Part by weight | 48 | 48 | 48 | 48 | 48 | 0/100 | 90 | 90 | 48 | 48 | 48 |
| Content ratio of {(C-1) + (C-2)}/{(B) + (E)} | | | 57/43 | 31/69 | 47/53 | 47/53 | 47/53 | — | 62/38 | 62/38 | 47/53 | 47/53 | — |
| Content ratio of (C-1)/(C-2) | | | 50/50 | 50/50 | | | | | 73/27 | 27/73 | 50/50 | 50/50 | 50/50 |
| Tensile strength at break | | MPa | 110 | 100 | 109 | 106 | 107 | 111 | 103 | 102 | 115 | 93 | 99 |
| Tensile elongation at break | | % | 2.55 | 2.52 | 2.64 | 2.66 | 2.68 | 2.75 | 2.45 | 2.48 | 2.74 | 2.32 | 2.47 |
| Heat distortion temperature | | °C. | 186 | 172 | 185 | 185 | 186 | 186 | 177 | 178 | 178 | 189 | 179 |
| Flammability rating | | Evaluation | V-0 | Substandard | Substandard | Substandard | Substandard | Substandard | V-0 | V-0 | Substandard | V-0 | Substandard |
| Bleed out (A: no, B: Yes) | | Visual inspection | B | A | A | A | A | A | B | B | A | A | A |
| Comparative tracking index | | V | 300 | 600 | 500 | 500 | 475 | 500 | 500 | 500 | 475 | 525 | 475 |

TABLE 8

|  | Symbol | Unit | Example 51 | Example 52 | Comparative Example 24 | Comparative Example 25 | Comparative Example 26 | Comparative Example 27 |
|---|---|---|---|---|---|---|---|---|
| (A) Thermoplastic polyester resin | A-1 | Part by weight | 80 | 80 | 80 | 80 | 80 | 80 |
| (B) Methacrylate resin | B-1 | Part by weight | 20 | 20 | 20 | 20 | 20 | 20 |
| Total content of (A) + (B) | — | Part by weight | 100 | 100 | 100 | 100 | 100 | 100 |
| (C-1) Condensed phosphate ester | C-1-1 | Part by weight | 15 | 15 | 30 | 0 | 30 | 0 |
| (C-2) Phosphazene compound | C-2-1 | Part by weight | 15 | 15 | 0 | 30 | 0 | 30 |
| (D) Nitrogen-containing flame retardant | D-1 | Part by weight | 10 | 10 | 10 | 10 | 10 | 10 |
| (E) Aromatic polycarbonate resin | E-1 | Part by weight | 0 | 20 | 0 | 0 | 20 | 20 |
| Total content of (C) | — | Part by weight | 30 | 30 | 30 | 30 | 30 | 30 |
| Content ratio of {(C-1) + (C-2)}/{(B) + (E)} |  |  | 60/40 | 43/57 | 60/40 | 60/40 | 43/57 | 43/57 |
| Content ratio of (C-1)/(C-2) |  |  | 50/50 | 50/50 | — | — | — | — |
| Tensile strength at break |  | MPa | 46 | 45 | 44 | 45 | 44 | 44 |
| Tensile elongation at break |  | % | 2.92 | 2.90 | 2.89 | 2.88 | 2.85 | 2.87 |
| Heat distortion temperature |  | °C. | 65 | 66 | 63 | 64 | 64 | 64 |
| Flammability rating |  | Evaluation | V-1 | V-1 | Substandard | Substandard | Substandard | Substandard |
| Bleed out (A: no, B: Yes) |  | Visual inspection | B | A | B | B | A | A |
| Comparative tracking index |  | V | 600 | 550 | 550 | 575 | 500 | 500 |
| Thickness of flame retardant layer |  | nm | 28 | 30 | 16 | 13 | 17 | 14 |

As evident from the comparison of Examples 1 to 7 with Comparative Examples 1 to 2, and comparison of Examples 19 to 25 with Comparative Examples 13 to 14, the flame-retardant thermoplastic polyester resin composition of the present invention having the thermoplastic polyester resin content of 50 to 95 parts by weight and the methacrylate resin content of 5 to 50 parts by weight had good balance between the flame retardancy and the tracking resistance as represented by the flame retardancy of V-2 or higher and the comparative tracking index of 400 V or higher.

As evident from the comparison of Example 2 with Examples 1 and 7 and the comparison of Example 20 with Examples 19 and 25, the flame-retardant thermoplastic polyester resin composition of the present invention having the thermoplastic polyester resin content of 70 to 90 parts by weight and the methacrylate resin content of 10 to 30 parts by weight had good balance between the flame retardancy and the tracking resistance as represented by the flame retardancy of V-0 and the comparative tracking index of 500 V or higher.

Comparative Examples 12 and 23 wherein the methacrylate resin (B) used was a methacryl copolymer resin having the methacrylate ester content in the main structural unit of less than 50% by weight exhibited insufficient flame retardancy.

As evident from the comparison of Examples 2 and 8 to 9 with Comparative Examples 3 to 6, and the comparison of Examples 20 and 26 to 27 with Comparative Examples 15 to 17, the flame retardant thermoplastic polyester resins containing two or more types of phosphor-containing flame retardant (C) have high toughness as represented by the tensile elongation at break of at least 2.5% without sacrificing the flame retardancy of at least V-2. In the case of Comparative Example 6 containing the OP-1240 which is an organic metal phosphinate salt (C-3), the toughness was reduced to the tensile elongation at break of up to 2.5% while the flame retardancy was retained.

As evident from the comparison of Examples 51 to 52 with Comparative Examples 24 to 27, Example 51 to 52 wherein the phosphor-containing flame retardants (C) were the combination of the condensed phosphate ester (C-1) and the phosphazene compound (C-2) had a thicker flame retardant layer and higher flame retardancy compared with Comparative Examples 24 to 27 prepared without using the combination of the phosphor-containing flame retardants (C).

As evident from the comparison of Example 2 and Examples 12 to 13 with different content ratio of (C-1)/(C-3), the flame-retardant thermoplastic polyester resin composition having the content ratio of (C-1)/(C-3) in the range of 20/80 to 40/60 had good balance between the toughness and the flame retardancy.

As evident from the comparison of Example 20 and Examples 30 to 35 with different content ratio of (C-1)/(C-2), the flame-retardant thermoplastic polyester resin composition having the content ratio of (C-1)/(C-2) in the range of 15/85 to 85/15 had good flame retardancy, and the flame-retardant thermoplastic polyester resin composition having the content ratio of (C-1)/(C-2) in the range of 30/70 to 70/30 had even higher flame retardancy.

As evident from the comparison of Example 26 and Examples 36 to 37 with different content ratio of (C-1)/(C-1), the flame-retardant thermoplastic polyester resin composition having the content ratio of (C-1)/(C-1) in the range of 30/70 to 70/30 had good flame retardancy.

As evident from the comparison of Example 20 containing (C-1)/(C-2) for the phosphor-containing flame retardants (C), Example 26 containing (C-1)/(C-1) for the phosphor-containing flame retardants (C), Example 29 containing (C-1)/(C-3) for the phosphor-containing flame retardants (C), and Example 28 containing (C-2)/(C-3) for the phosphor-containing flame retardants (C), the flame-retardant thermoplastic polyester resin composition containing (C-1)/(C-2) had good balance of the flame retardancy, the tracking resistance, the tensile strength, and the tensile elongation.

As evident from the comparison of Example 2 and Examples 10 to 11, the flame-retardant thermoplastic polyester resin composition having a content of the phosphor-containing flame retardants (C) in the range of 20 to 60 parts by weight had good balance between the flame retardancy and the toughness.

Comparative Examples 7 and 18 not containing the phosphor-containing flame retardants (C) had the flame retardancy of substandard level. In the meanwhile, Comparative Examples 8 to 9 and Comparative Examples 19 to 20 containing the phosphor-containing flame retardants (C) in excess of 70 parts by weight exhibited insufficient toughness as represented by the tensile elongation at break of less than 2.5% while the flame retardancy was sufficient.

Comparative Examples 10 and 21 not containing the nitrogen-containing flame retardant (D) exhibited unstable substandard flame retardancy. In the meanwhile, Comparative Examples 11 and 22 containing the nitrogen-containing flame retardant (D) in excess of 90 parts by weight exhibited insufficient toughness as represented by the tensile elongation at break of less than 2.5% while the flame retardancy was sufficient.

As evident from the comparison of Example 41 with Example 20, the flame-retardant thermoplastic polyester resin composition containing the aromatic polycarbonate resin (E) had improved flame retardancy and toughness, and the bleed out could be suppressed. In the meanwhile, as evident from the comparison of Example 20 with Example 42, the flame-retardant thermoplastic polyester resin composition having the content of the aromatic polycarbonate resin (E) of up to 50 parts by weight exhibited excellent comparative tracking index.

As evident from the comparison of Examples 19 to 20 with Examples 41 and 43 to 44, the flame-retardant thermoplastic polyester resin compositions having a total content of the condensed phosphate ester (C-1) and the phosphazene compound (C-2) in relation to the total content of the methacrylate resin (B) and the aromatic polycarbonate resin (E) ({(C-1)+(C-2)}/{(B)+(E)}) in the range of 50/50 to 30/70 (weight ratio) exhibited with the flame retardancy of at least V-1, with no occurrence of the bleed out, namely good balance between the flame retardancy and the suppression of the bleed out.

As evident from the comparison of Example 2 with Examples 14 to 15 and the comparison of Example 20 with Examples 38 to 39, addition of the alkaline earth metal salt (F) resulted in the improvement of the comparative tracking index.

As evident from the comparison of Examples 14 and 15 with Examples 38 and 39, the flame-retardant thermoplastic polyester resin composition containing calcium carbonate for the alkaline earth metal salt (F) exhibited improved tracking resistance.

As evident from the comparison of Examples 14 and 16 with Examples 38 and 40, the flame-retardant thermoplastic polyester resin composition containing up to 5 parts by weight of the alkaline earth metal salt (F) exhibited high toughness while retaining the tracking resistance.

As evident from the comparison of Example 17 and Example 45 with Example 2 and Example 20, the flame-retardant thermoplastic polyester resin composition containing the glass fiber (G) exhibits improved tensile strength and heat distortion temperature.

As evident from the comparison of Example 2 and Example 18 and the comparison of Example 20 and Examples 46 to 50, the merits of the present invention are realized when other additives (H) are added as desired.

The flame-retardant thermoplastic polyester resin compositions of the Examples shown in Tables 1 to 5 and 8 exhibited good balance between the tracking resistance (comparative tracking index of at least 400 V) and the toughness (tensile elongation at break of at least 2.5%) without sacrificing the high flame retardancy (at least V-2), and the resulting flame-retardant thermoplastic polyester resin compositions were well adapted as a material used near the electric field.

The invention claimed is:

1. A flame-retardant thermoplastic polyester resin composition comprising:
    100 parts by weight in total of
        (A) 50 to 95 parts by weight of a thermoplastic polyester resin, and
        (B) 5 to 50 parts by weight of a methacrylate resin;
    1 to 70 parts by weight of (C) phosphor-containing flame retardants which are at least 2 members selected from the group consisting of (C-1) a condensed phosphate ester, (C-2) a phosphazene compound, and (C-3) an organic metal phosphinate salt in relation to 100 parts by weight of the total of (A) and (B);
    1 to 90 parts by weight of (D) a nitrogen-containing flame retardant in relation to 100 parts by weight of the total of (A) and (B); and
    1 to 50 parts by weight of (E) an aromatic polycarbonate resin in relation to 100 parts by weight of the total of the thermoplastic polyester resin (A) and the methacrylate resin (B);
    wherein ratio of total content of the condensed phosphate ester (C-1) and the phosphazene compound (C-2) to the total content of the methacrylate resin (B) and the aromatic polycarbonate resin (E) ({(C-1)+(C-2)}/{(B)+(E)}) is 50/50 to 30/70 (weight ratio).

2. A flame-retardant thermoplastic polyester resin composition according to claim 1 further comprising
    1 to 150 parts by weight of (G) glass fiber in relation to 100 parts by weight of the total of the thermoplastic polyester resin (A) and the methacrylate resin (B).

3. A flame-retardant thermoplastic polyester resin composition according to claim 1 further comprising
    0.01 to 5 parts by weight of (F) an alkaline earth metal salt in relation to 100 parts by weight of the total of the thermoplastic polyester resin (A) and the methacrylate resin (B).

4. A flame-retardant thermoplastic polyester resin composition according to claim 3 wherein the alkaline earth metal salt (F) is calcium carbonate.

5. A molded article prepared by melt molding of the flame-retardant thermoplastic polyester resin composition according to claim 1.

6. A molded article according to claim 5 wherein the molded article has a comparative tracking index based on IEC 60112 of at least 400 V.

7. A molded article according to claim 5 wherein a layer formed from the phosphor-containing flame retardant of at least 20 nm in depth is formed on the surface in the burning of the molded article.

* * * * *